United States Patent
Peng

(10) Patent No.: US 10,659,915 B2
(45) Date of Patent: May 19, 2020

(54) ANTI-DISASTER SYSTEM, INFORMATION GENERATING METHOD AND STORAGE MEDIUM

(71) Applicant: NEC Corporation, Minato-ku, Tokyo (JP)

(72) Inventor: Xiao Peng, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/462,629

(22) PCT Filed: Nov. 25, 2016

(86) PCT No.: PCT/JP2016/085037
§ 371 (c)(1),
(2) Date: May 21, 2019

(87) PCT Pub. No.: WO2018/096662
PCT Pub. Date: May 31, 2018

(65) Prior Publication Data
US 2019/0306655 A1    Oct. 3, 2019

(51) Int. Cl.
*H04W 4/021*    (2018.01)
*H04W 4/90*    (2018.01)
(Continued)

(52) U.S. Cl.
CPC ........... *H04W 4/021* (2013.01); *H04W 4/022* (2013.01); *H04W 4/029* (2018.02); *H04W 4/90* (2018.02); *H04W 64/00* (2013.01)

(58) Field of Classification Search
CPC ....... H04W 4/90; H04W 4/029; H04W 4/021; H04W 76/50; H04W 4/025; H04W 4/024;
(Continued)

(56) References Cited

U.S. PATENT DOCUMENTS

2002/0183069 A1   12/2002   Myr
2012/0190295 A1   7/2012   Kim et al.
(Continued)

FOREIGN PATENT DOCUMENTS

EP    1353524 A1   10/2003
EP    2555503 A1   2/2013
(Continued)

OTHER PUBLICATIONS

International Search Report for PCT Application No. PCT/JP2016/085037, dated Aug. 18. 2017.
(Continued)

*Primary Examiner* — Kwasi Karikari

(57) ABSTRACT

An anti-disaster system, comprising: disaster detection apparatuses detecting an occurrence of disaster; position processing apparatuses generating distribution information; base stations communicating with the mobile station; and a control apparatus. The control apparatus determines a disaster region concerned among a plurality of regions, based on a message from the disaster detection apparatus located in the disaster region concerned. The control apparatus instructs the position processing apparatus located in the disaster region concerned to generate the distribution information based on information from the base station located in the disaster region concerned.

16 Claims, 28 Drawing Sheets

(51) Int. Cl.
*H04W 64/00* (2009.01)
*H04W 4/029* (2018.01)

(58) Field of Classification Search
CPC ......... H04W 4/38; H04W 4/14; H04W 64/00; H04W 12/00503; H04W 84/06
See application file for complete search history.

(56) References Cited

U.S. PATENT DOCUMENTS

| | | | |
|---|---|---|---|
| 2012/0208493 A1* | 8/2012 | Park | H04W 4/90 455/404.2 |
| 2012/0231727 A1 | 9/2012 | Nagata et al. | |
| 2012/0302199 A1 | 11/2012 | Yamashita | |
| 2013/0052983 A1 | 2/2013 | Fletcher et al. | |
| 2013/0157610 A1* | 6/2013 | Vainik | G06F 11/0781 455/404.1 |
| 2014/0302877 A1 | 10/2014 | Johnson | |
| 2016/0029194 A1* | 1/2016 | Jang | H04W 4/02 455/404.2 |

FOREIGN PATENT DOCUMENTS

| | | |
|---|---|---|
| EP | 2908300 A1 | 8/2015 |
| GB | 2526585 A | 12/2015 |
| JP | 2005-080211 A | 3/2005 |
| JP | 2007-265115 A | 10/2007 |
| JP | 2007-335935 A | 12/2007 |
| JP | 2011-090632 A | 5/2011 |
| JP | 2011-215001 A | 10/2011 |
| JP | 2012-226526 A | 11/2012 |
| JP | 2014-060507 A | 4/2014 |
| WO | 97/14257 A1 | 4/1997 |
| WO | 02/052873 A2 | 7/2002 |

OTHER PUBLICATIONS

Written opinion for PCT Application No. PCT/JP2016/085037.
Japanese Office Action for JP Application No. 2019-528159 dated Mar. 17, 2020 with English Translation.

* cited by examiner

FIG. 9

| SENDER OF EVENT OCCURRENCE MESSAGE | DESTINATION OF POSITION REQUEST MESSAGE | DESTINAION OF STOP FIFO MESSAGE |
|---|---|---|
| DISASTER DETECTION APPRATUS 40-1 | POSITION PROCESSING APPARATUS 30-1 | BS 50-1, BS 50-2, ··· |
| DISASTER DETECTION APPRATUS 40-2 | POSITION PROCESSING APPARATUS 30-2 | BS 50-3, BS 50-4, ··· |
| ⋮ | ⋮ | ⋮ |

FIG. 11

| SENDER OF CHANNEL INFORMATION | CHANNEL INFORMATION (MS 60-1) | CHANNEL INFORMATION (MS 60-2) | CHANNEL INFORMATION (MS 60-3) | ... |
|---|---|---|---|---|
| BASE STATION 50-1 | RSS_1 | RSS_2 | RSS_3 | ... |
| BASE STATION 50-2 | RSS_4 | None | RSS_5 | ... |
| ... | ... | ... | ... | ... |

FIG. 12

| MOBILE STATION | POSITION INFORMATION |
|---|---|
| MS 60-1 | (X1, Y1) |
| MS 60-2 | (X2, Y2) |
| ⋮ | ⋮ |

FIG. 13

DISTRIBUTION INFORMATION

| POSITION | NUMBER OF MS |
|---|---|
| (X1, Y1) | A1 |
| (X2, Y2) | A2 |
| ⋮ | ⋮ |

ANTI-DISASTER SYSTEM, INFORMATION GENERATING METHOD AND STORAGE MEDIUM

This application is a National Stage Entry of PCT/JP2016/085037 filed on Nov. 25, 2016, the contents of all of which are incorporated herein by reference, in their entirety.

TECHNICAL FIELD

The present invention relates to an anti-disaster system, an information generating method and a storage medium storing a computer program, and more particularly to an anti-disaster system that determines positions of one or more mobile stations (MSs) in a disaster region.

BACKGROUND

Before a disaster (for example, tsunami or flood) happens, if we can know a position of all the people, a notification and protection related to the disaster will be much more efficient. For example, if we can know the position of all people before the disaster occurs, we can change emergency lever for notification and protection in accordance with position information. For example, if there are no people in an area affected by the disaster, there is no need for notification and protection.

Alternatively, when such a disaster as fire, exposition explosion and earthquake happens, if we can know the position of all the people at the first time, a rescue or search will be much more efficient. For example, the position information may help making immediate rescue plan or may avoid an unnecessary search. Thus, the position information is important for anti-disaster.

In an anti-disaster field, there are equipment (instruments). For example, position equipment for fireman is used. We can know a position of fireman by using a wireless device which is mounted on the fireman. Alternatively, life detector instrument is used to detect human heat, sound, pulse, etc. We can know the position of the survivor by using this instrument.

However, there are demerits of those equipment (instruments). For example, regarding the position equipment for fireman, we can know only the position of fireman and cannot know the position of the survivor. Alternatively, regarding life detector instrument, because the accuracy for detection is sensitive to an environment, the detection range is limited.

There are prior arts determining the position of a mobile terminal. Patent literatures (PTLs) 1 and 2 disclose a wireless network system such as a cellar system used for determining position of the mobile terminal. Further, in Patent literatures 3 to 6, various technologies related to mobile communication are disclosed.

In addition, Patent Literature 7 discloses a position estimation method using RSS (Received Signal Strength) data obtained from a plurality of base stations. In this method, distances between the base stations and terminal are estimated based on the RSS data.

[PTL 1]
WO1997/014257A1
[PTL 2]
WO2002/052873A1
[PTL 3]
European patent Application Publication No. EP1353524A1
[PTL 4]
United States Patent Application Publication No. US2012-0231727A1
[PTL 5]
United States Patent Application Publication No. US2002-0183069A1
[PTL 6]
United States Patent Application Publication No. US2014-0302877A1
[PTL 7]
Japanese Patent Laid-open Publication No. JP 2011-215001A

SUMMARY

Here, in order to detect the position of people for anti-disaster, the possible candidate is the wireless network system (cellular system) as disclosed in Patent literatures 1 and 2. However, when the technique of positioning of people using the wireless network system is applied to anti-disaster, problem will occurs. More specifically, in such a large scale positioning, there are two issues in the current cellar system.

Since we cannot predict the disaster happening, it needs huge computation resource for tracking all the people all the time. That is, huge computation problem will occur.

On the other hand, in ordinary situation, the position of people is the privacy which people determine whether to release to others or not. It is hard to force all the users to provide their positions all the time. That is, privacy problem will occur.

It is an object of the present invention to contribute to provide an anti-disaster system which can obtain information for anti-disaster with small computation while protecting the privacy.

According to a first aspect, there is provided an anti-disaster system, comprising: a plurality of disaster detection apparatuses each of which detects an occurrence of disaster; a plurality of position processing apparatuses each of which generates distribution information which indicates a number of mobile stations in each position; a plurality of base stations each of which communicates with the mobile station; and a control apparatus that communicates with the plurality of disaster detection apparatuses, the plurality of base stations and the plurality of position processing apparatuses. One disaster detection apparatus, one position processing apparatus and at least one base station are located in a same region. The control apparatus determines a disaster region concerned among a plurality of regions, based on a message from the disaster detection apparatus located in the disaster region concerned. The control apparatus instructs the position processing apparatus located in the disaster region concerned to generate the distribution information based on information from the base station located in the disaster region concerned.

According to a second aspect, there is provided an information generating method in an anti-disaster system comprising: a plurality of disaster detection apparatuses each of which detects an occurrence of disaster; a plurality of position processing apparatuses each of which generates distribution information which indicates a number of mobile stations in each position; a plurality of base stations each of which communicates with the mobile station; and a control apparatus that communicates with the plurality of disaster detection apparatuses, the plurality of base stations and the plurality of position processing apparatuses. One disaster detection apparatus, one position processing apparatus and at least one base station are located in a same region. The information generating method, comprising: the control apparatus determining a disaster region concerned among a plurality of regions, based on a message from the disaster detection apparatus located in the disaster region concerned, and the control apparatus instructing the position processing apparatus located in the disaster region concerned to generate the distribution information based on information from the base station located in the disaster region concerned.

According to a third aspect, there is provided a storage medium storing an anti-disaster program executed by a computer embedded on a control apparatus included in an anti-disaster system, the anti-disaster system further including: a plurality of disaster detection apparatuses each of which detects an occurrence of disaster; a plurality of position processing apparatuses each of which generates distribution information which indicates a number of mobile stations in each position; and a plurality of base stations each of which communicates with the mobile station. One disaster detection apparatus, one position processing apparatus and at least one base station are located in a same region. The program causes the computer to execute: communicating with the plurality of disaster detection apparatuses, the plurality of base stations and the plurality of position processing apparatuses; determining a disaster region concerned among a plurality of regions, based on a message from the disaster detection apparatus located in the disaster region concerned, and instructing the position processing apparatus located in the disaster region concerned to generate the distribution information based on information from the base station located in the disaster region concerned. The above-mentioned program can be recorded in a computer-readable storage medium. The storage medium may be a non-transient medium such as a semiconductor memory, a hard disk, a magnetic recording medium, or an optical recording medium. The present invention can be embodied as a computer program product.

According to the present invention, an anti-disaster system which contributes to obtaining information for anti-disaster with small computation while protecting the privacy is provided.

BRIEF DESCRIPTION OF DRAWINGS

FIG. 9 is a diagram showing an example stored in a memory.

FIG. 11 is a diagram for explaining a calculation of the position information.

FIG. 12 is diagram for explaining the calculation of the position information.

FIG. 13 is a diagram showing an example of the distribution information.

PREFERRED MODES

Figure 1:
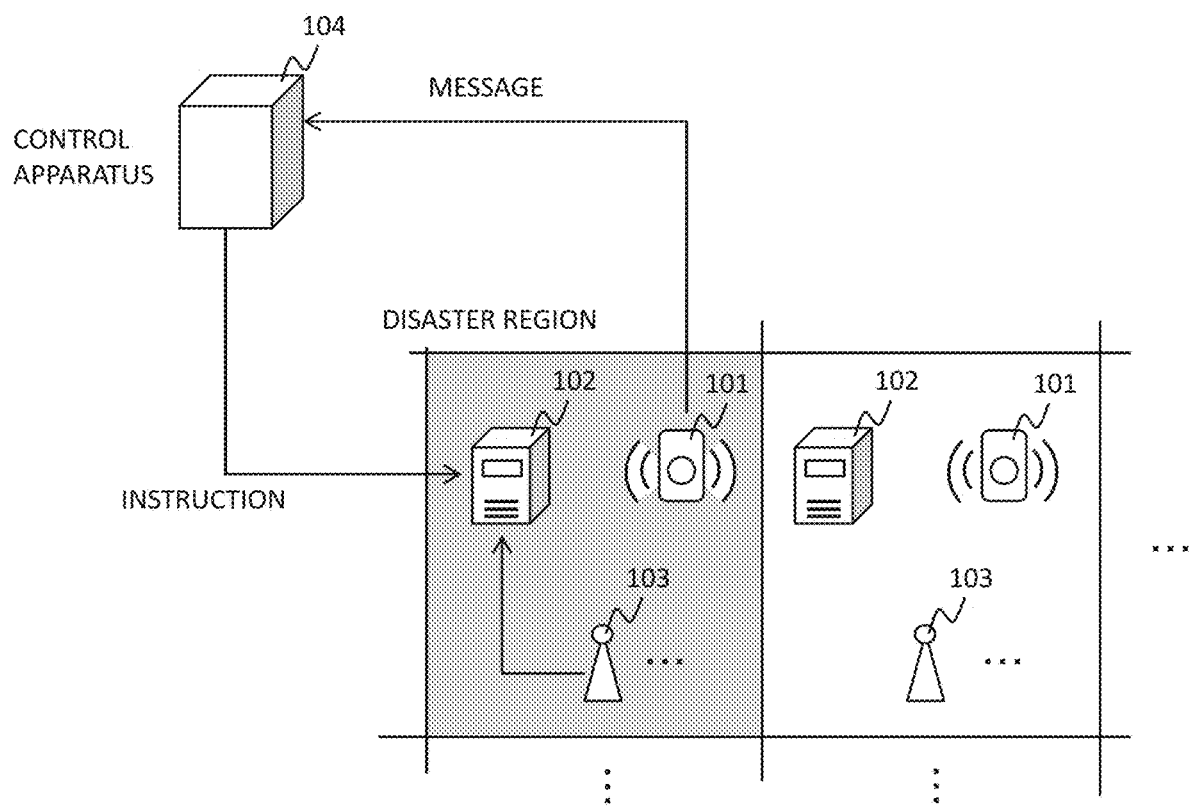
FIG. 1 illustrates an outline of an example embodiment.

First, an outline of an example embodiment will be described with reference to FIG. 1. In the following outline, various components are denoted by reference characters for the sake of convenience. Namely, the following reference characters are merely used as examples to facilitate understanding of the present invention. Thus, the present invention is not limited to the description of the following outline.

An anti-disaster system, comprising: a plurality of disaster detection apparatuses 101 each of which detects an occurrence of disaster; a plurality of position processing apparatuses 102 each of which generates distribution information which indicates a number of mobile stations in each position; a plurality of base stations 103 each of which communicates with the mobile station; and a control apparatus 104 that communicates with the plurality of disaster detection apparatuses 101, the plurality of base stations 103 and the plurality of position processing apparatuses 102. One disaster detection apparatus, one position processing apparatus and at least one base station are located in a same region. The control apparatus 104 determines a disaster region concerned among a plurality of regions, based on a message from the disaster detection apparatus 101 located in the disaster region concerned. The control apparatus 104 instructs the position processing apparatus 102 located in the disaster region concerned to generate the distribution information based on information from the base station 103 located in the disaster region concerned.

The control apparatus 104 determines a region where the disaster happened based on the message received from the disaster detection apparatus 101 in the disaster region concerned. After that, the control apparatus 104 instructs only the position processing apparatus 102 located in the disaster region concerned to generate the distribution information (information for anti-disaster). A computation regarding information is limited to the disaster region concerned, thereby information for anti-disaster is obtained with small computation. In addition, by not including identifier (ID) of each mobile station in the distribution information, personal privacy is protected.

Next, specific embodiments will be described in more detail with reference to the drawings.

First Example Embodiment

A first example embodiment will be described more in detail below with reference to the drawings.

Figure 2:
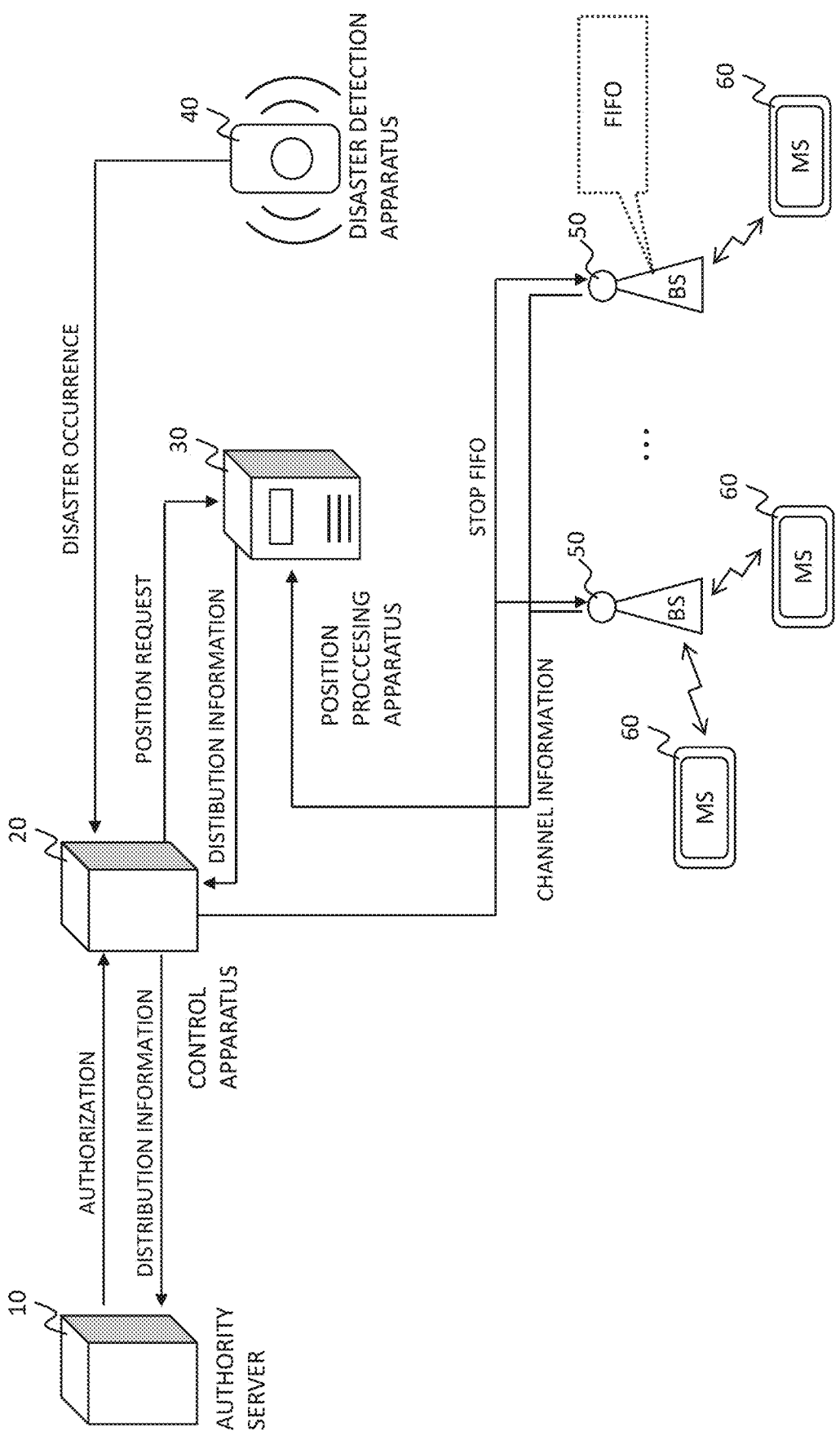
FIG. 2 is a conceptual view of an anti-disaster system according to a first example embodiment.

FIG. 2 is a conceptual view of an anti-disaster system according to the first example embodiment. In FIG. 2, the anti-disaster system comprises an authority server 10, a control apparatus 20, a position processing apparatus 30, a disaster detection apparatus 40, base stations 50 and mobile stations 60.

Apparatuses in FIG. 2 are connected with each other via such a network as internet. The mobile station (MS) 60 and the base station (BS) 50 perform communication through wireless signal. For example, the mobile station 60 and base station 50 communicate with each other by a LTE (Long Term Evolution) or 3G (third generation).

The authority server 10 is located in a public institution such as fire department or Meteorological Agency. The authority server 10 gives an authorization to the control apparatus 20 so as to handle distribution information.

The control apparatus 20 is located in a control center which manages each region. The control apparatus is configured to communicate with a plurality of disaster detection apparatuses 40, a plurality of base stations 50 and a plurality of position processing apparatuses 30. The control apparatus 20 deals with anti-disaster information of each region. More specifically, when a disaster happens, the control apparatus 20 instructs the position processing apparatus 30 located in the disaster region concerned to generate distribution information. At that time, the control apparatus 20 sends a position request message to the position processing apparatus 30. When the position processing apparatus 30 receives the position request message, the position processing apparatus 30 generates the distribution information and send this information to the control apparatus 20. The control apparatus 20 forwards the generated distribution information to the authority server 10.

Further, the control apparatus 20 instructs each base station 50 located in the disaster region concerned to send information (channel information described later) to the position processing apparatus 30 in the disaster region. At that time, the control apparatus 20 sends a stop FIFO (First-In First Out) message to each base station 50 as the instruction. It should be noted that the stop FIFO message will be explained later.

The distribution information indicates a number of mobile stations 60 located in the disaster region in each position (in each address). By referring to the distribution information, the authority server 10 can know how many people exist in the region where the disaster happened. That is, the authority server 10 can use the distribution information for anti-disaster. For example, when tsunami or flood happens, the authority server 10 issues an evacuation advisory to the region of disaster or makes rescue plan.

The position processing apparatus 30 is located in each region. The position processing apparatus 30 calculates position information which indicates a position (or coordinates) regarding each mobile station 60 located in the disaster region based on information obtained from the base stations 50. More specifically, the position processing apparatus 30 calculates the position information based on channel information. The channel information is obtained from the communication between the base station 50 and the mobile station 60. That is, the channel information is obtained so as to calculate the position information (address or coordinates information of each mobile station 60). A RSS (Received Signal Strength) data is exemplified as the channel information. It should be noted that channel information is not limited to RSS.

The disaster detection apparatus 40 is located in each region. The disaster detection apparatus 40 detects an occurrence of disaster (or event). For example, the disaster detection apparatus 40 is a firebox or a seismic intensity meter for tsunami. It should be noted that a sensor included in the detection apparatus 40 is different in accordance with the disaster. When the disaster detection apparatus 40 detects the occurrence of disaster, the disaster detection apparatus 40 sends a disaster occurrence message to the control apparatus 20. By receiving this message, the control apparatus 40 can determine the disaster region concerned among a plurality of regions which the control apparatus manages.

The base station 50 and the mobile station 60 communicate with each other. The base station 50 has a memory to store the channel information regarding each mobile station 60. In the first example embodiment, a FIFO memory is exemplified as the memory.

Figure 3:
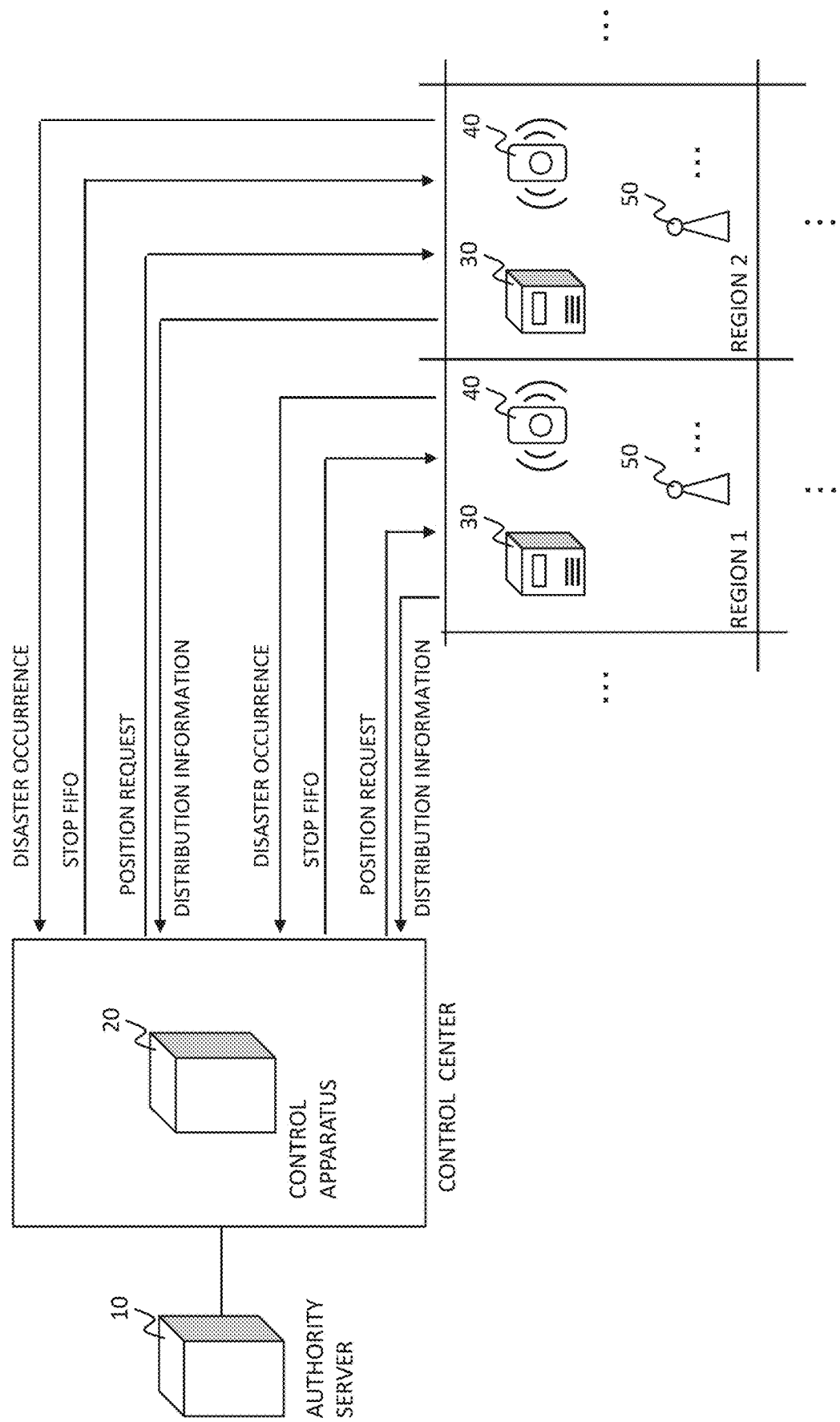
FIG. 3 is a conceptual view of a relationship between each apparatuses described in FIG. 2.

FIG. 3 is a conceptual view of a relationship between apparatuses described in FIG. 2. As shown in FIG. 3, the position processing apparatus 30 and the disaster detection apparatus 40 are located in each region. Further, each region includes a plurality of the base stations 50. That is, one disaster detection apparatus 40, one position processing apparatus 30 and at least one base station 50 are located in same region.

When the disaster happens, the disaster detection apparatus 40 corresponding to the disaster region sends the disaster occurrence message to the control apparatus 20. When the control apparatus 20 receives the disaster occurrence message, the control apparatus 20 determines the disaster region based on a sender of the disaster occurrence message. For example, when the control apparatus 20 receives the disaster occurrence message from the disaster detection apparatus 40 in region 1, the control apparatus 20 determines that the disaster happened in region 1.

At that time, the control apparatus 20 sends the position request message to the position processing apparatus 30 included in the disaster region. In the above-mentioned example, the control apparatus 20 sends the position request message to the position processing apparatus 30 in region 1.

In addition, the control apparatus 20 sends the stop FIFO message to base stations 50 in the disaster region. In the above-mentioned example, the control apparatus 20 sends the stop FIFO message to the base stations 50 in region 1.

In an ordinary situation (i.e., no disaster happens), the base station 50 and the mobile station 60 communicate with each other. In this situation, the base station 50 continues to calculate the channel information and stores the calculated channel information in the FIFO.

When the base station 50 receives the stop FIFO message (i.e., disaster happens), the base station 50 stops updating the FIFO with the channel information and sends the stored channel information to the position processing apparatus 30. It should be noted that updating FIFO is stopped so as to prevent that necessary data (channel information) for calculating the position information in the event of the disaster will lost.

When the position processing apparatus 30 receives the position request message from the control apparatus 20, the position processing apparatus 30 calculates the position information regarding each mobile station 60 in the disaster region. In the above-mentioned example, the position processing apparatus 30 in region 1 calculates the position information regarding the mobile stations 60 in region 1.

After that, the position processing apparatus 30 generates the distribution information. More specifically, the position processing apparatus 30 collects each the position information regarding the mobile station 60 to generate the distribution information. The distribution information includes address (or coordinates) information of the mobile station 60 in the disaster region. In the above-mentioned example, the distribution information includes the position (coordinates) of the mobile stations 60 in region 1. The position processing apparatus 30 sends the distribution information to the control apparatus 20.

The control apparatus 20 sends the received distribution information to the authority server 10.

<Configuration of Hardware>

Next, hardware configurations of each apparatus included in the anti-disaster system according to the first example embodiment will be explained.

Figure 4:
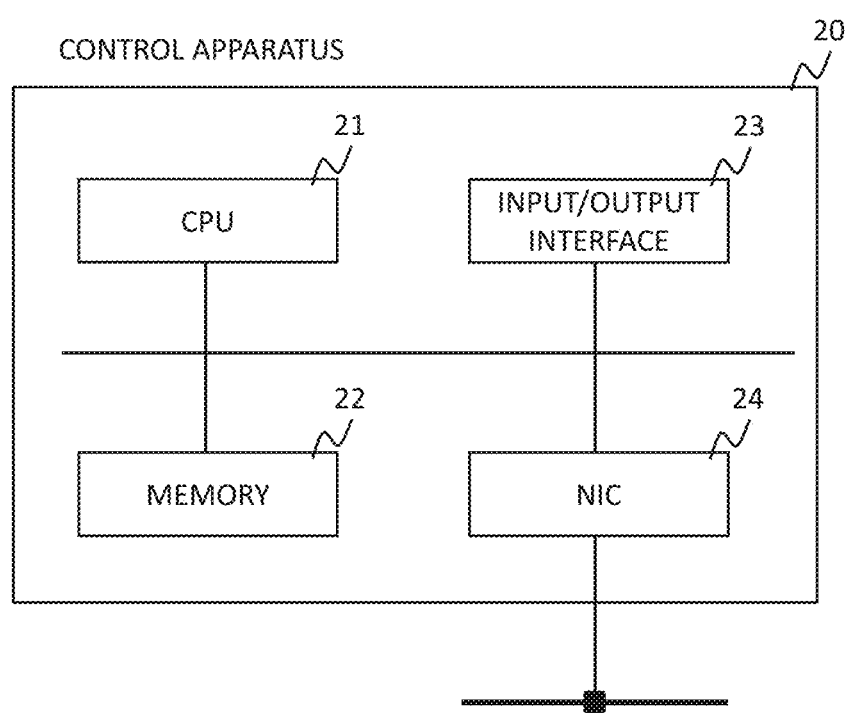
FIG. 4 is a block diagram showing a hardware configuration of a control apparatus.

FIG. 4 is a block diagram showing a hardware configuration of the control apparatus 20.

The control apparatus 20 is realized by a computer and has a configuration described in FIG. 4. For example, the control apparatus 20 comprises a CPU (Central Processing Unit) 21, a memory 22, an input/output interface 23 and a NIC (Network Interface Card) 24. Those elements are connected to each other through an internal bus.

The configuration in FIG. 4 does not limit the hardware configuration of the control apparatus 20. The control apparatus 20 may comprise an element not described in FIG. 4, or may not comprise the input/output interface 23 or the NIC 24 in necessary. Further, the number of CPU 21 or the like is not limited to the example in FIG. 4. For example, a plurality of CPUs may be included in the control apparatus 20.

The memory 22 is a RAM (Random Access Memory), ROM (Read Only Memory) or a HDD (Hard Disk Drive) or the like.

The input/output interface 23 is an interface for a display apparatus or input apparatus not shown in FIG. 4. For example, the display apparatus is a liquid crystal display or the like. For example, the input apparatus is such an apparatus receiving user operation as a keyboard and mouse. In addition, a USB (Universal Serial Bus) memory is included as the input apparatus.

The function of the control apparatus 20 can be realized by various types of processing module after-mentioned. For example, the processing module can be realized by that the CPU 21 executes a program stored in the memory 22. Further, the program can be updated by downloading the program via a network or a storage medium storing the program. In addition, the above-mentioned processing module can be realized by a semiconductor chip. That is, it is sufficient that there is a means for executing the function of the above-mentioned processing module on a hardware and/or software.

It should be noted that the authority server 10 and the position processing apparatus 30 may have same configuration as the control apparatus 20. Therefore, explanations of those apparatuses are omitted.

Figure 5:
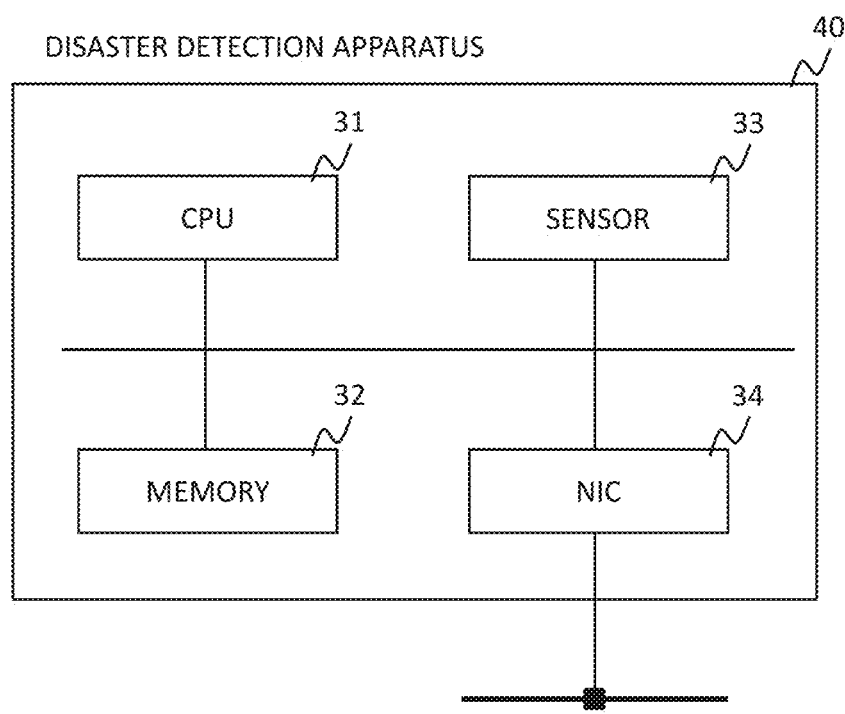
FIG. 5 is a block diagram showing a hardware configuration of a disaster detection apparatus.

FIG. 5 is a block diagram showing a hardware configuration of the disaster detection apparatus 40.

The disaster detection apparatus 40 has a configuration described in FIG. 5. The disaster detection apparatus 40 has a sensor 33 in addition to a CPU 31, a memory 32 and a NIC 34. The sensor 33 detects an occurrence of disaster. Type of the sensor 33 is changed in accordance with the disaster. For example, in fire application, smoke detector is used as the sensor 33. It should be noted that explanation of the CPU 31 or the like is omitted. In addition, the function of the disaster detection apparatus 40 can be realized by execution of a program stored in memory 32.

Figure 6:
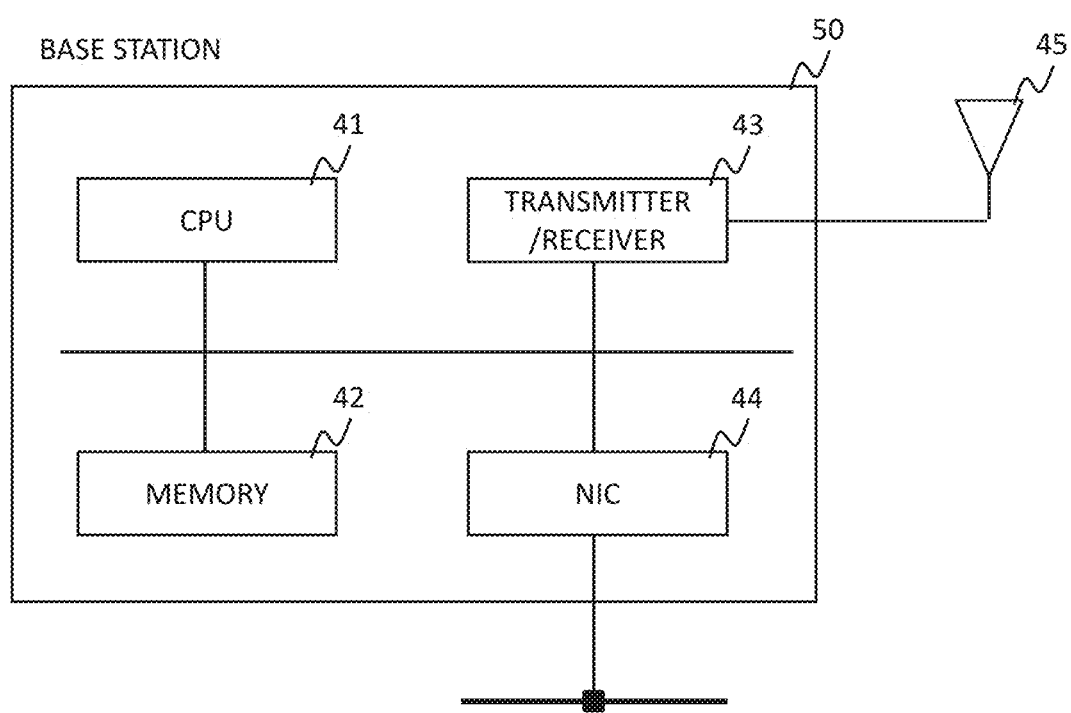
FIG. 6 is a block diagram showing a hardware configuration of a base station.

FIG. 6 is a block diagram showing a hardware configuration of the base station 50.

The base station 50 has a configuration described in FIG. 6. The base station 50 has a transmitter/receiver 43 in addition to a CPU 41, a memory 42 and a NIC 44. The transmitter/receiver 43 is connected to an antenna 45. The transmitter/receiver 43 demodulates and decodes a received signal via the antenna 45. Further, the transmitter/receiver 43 outputs the decoded data to the CPU 41. The transmitter/receiver 43 encodes and modulates a data from the CPU 41. Further, the transmitter/receiver 43 transmits the modulated data to the mobile station 60 via the antenna 45. It should be noted that explanation of the CPU 41 or the like is omitted. In addition, the function of the base station 50 can be realized by execution of a program stored in memory 42.

<Processing Module>

Next, processing modules of each apparatus included in the anti-disaster system according to the first example embodiment will be explained.

Figure 7:
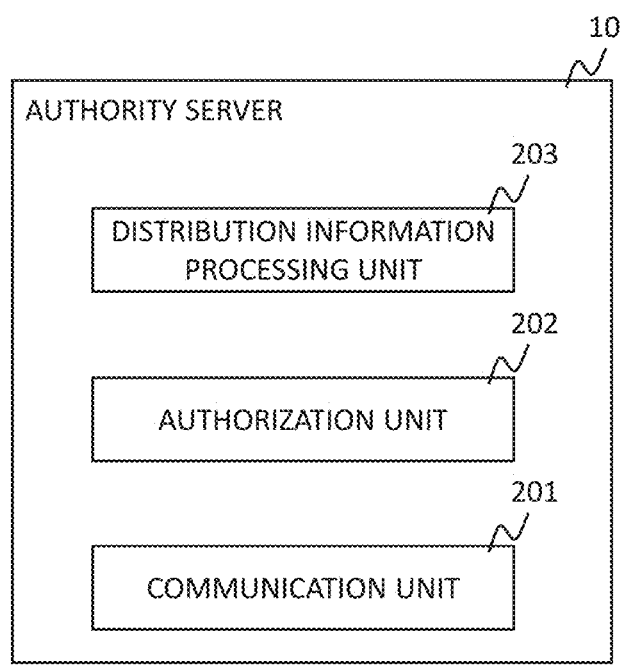
FIG. 7 is a block diagram showing processing modules of an authority server.

FIG. 7 is a block diagram showing processing modules of the authority server 10 according to the first example embodiment. As shown in FIG. 7, the authority server 10 comprises a communication unit 201, an authorization unit 202 and a distribution information processing unit 203.

The communication unit 201 is means for controlling communication with other apparatus (for example, the control apparatus 20 or the like).

The authorization unit 202 is means for giving the control apparatus 20 an authorization to handle the distribution information.

The distribution information processing unit 203 is means for processing the distribution information. For example, the distribution information processing unit 203 visualizes the distribution information so that the user (for example, anti-disaster personnel) can determine a necessary support. For example, the user provided this information may make rescue plan or the like.

Figure 8:
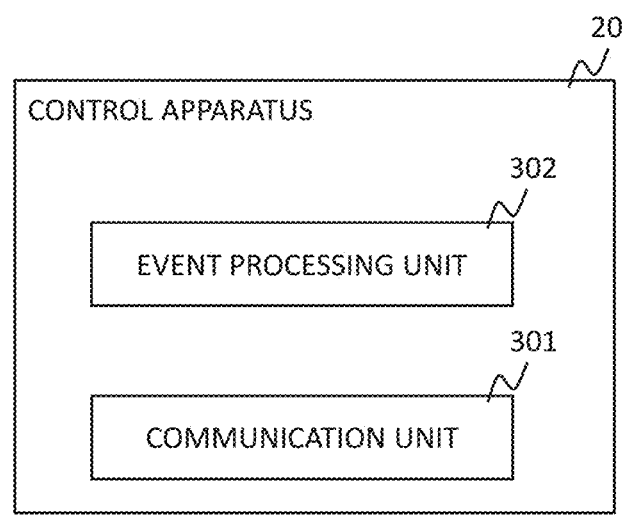
FIG. 8 is a block diagram showing processing modules of the control apparatus.

FIG. 8 is a block diagram showing processing modules of the control apparatus 20 according to the first example embodiment. As shown in FIG. 8, the control apparatus 20 comprises a communication unit 301 and an event processing unit 302.

The communication unit 301 is means for controlling communication with other apparatus (for example, the authority server 10 or the like).

The event processing unit 302 is means for processing the disaster occurrence message from the disaster detection apparatus 40. More specifically, when the event processing unit 302 receives the disaster occurrence message, the event processing unit 302 refers to information stored in memory so as to determine the position processing apparatus 30 as destination of the position request message and the base stations 50 as destination of the stop FIFO message. For example, information shown in FIG. 9 is stored in the memory. Referring to such information, the event processing unit 302 can determine the destination of sending messages. It should be noted that information shown as FIG. 9 is prepared in advance by an administrator of the system and stored in the memory.

When the control apparatus 20 receives the distribution information from the position processing apparatus 30, the event processing unit 302 sends this information to the authority server 10.

Figure 10:
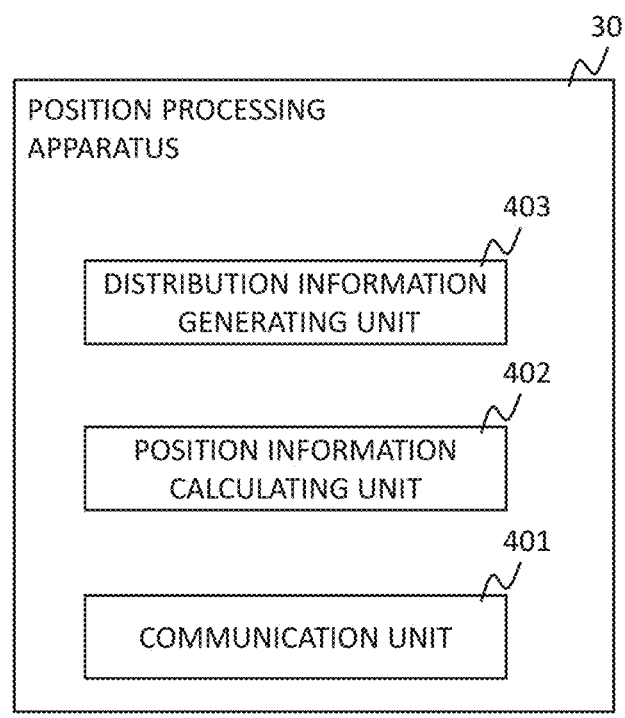
FIG. 10 is a block diagram showing processing modules of the position processing apparatus.

FIG. 10 is a block diagram showing processing modules of the position processing apparatus 30 according to the first example embodiment. As shown in FIG. 10, the position processing apparatus 30 comprises a communication unit 401, a position information calculating unit 402 and a distribution information generating unit 403.

The communication unit 401 is means for controlling communication with other apparatus (for example, the control apparatus 20 or the like).

The position information calculating unit 402 is means for calculating the position information. More specifically, the position information calculating unit 402 calculates address information of each mobile station 60 based on the channel information received from the base station 50.

When the base station 50 receives the stop FIFO message, the base station 50 sends the channel information (for example, RSS data) for each mobile station with which the base station 50 communicates. The received channel information is stored in the memory of the position processing apparatus 30. As a result, such information shown in FIG. 11 is obtained. As shown in FIG. 11, RSS data for each mobile station 60 are managed being associated with IDs (identifiers) of the mobile station 60 and base station 50. Thus, the channel information is managed for each mobile station 60 with ID.

The position information calculating unit 402 calculates the position information of the each mobile station 60 based on the channel information. More specifically, the position information calculating unit 402 calculates the position information by a method disclosed in Patent Literature 7. It should be noted that the method for calculating the position information is not limited to the method of Patent Literature 7. Various fingerprint methods can be used for calculating the position information. For example, AoA (Angle of Arrival) method using channel impulse response data may be used for calculating the position information.

The position information calculating unit 402 stores the calculated information in the memory. After that, the position information calculating unit 402 notifies the distribution information generating unit 403 of completion of calculating the channel information. As a result, information shown in FIG. 12 is stored in the memory.

The distribution information generating unit 403 is means for generating the distribution information. More specifically, the distribution information generating unit 403 generates the distribution information based on the calculated position information (for example, information shown in FIG. 12). The distribution information generating unit 403 counts a number of the mobile station 60 in each position (address or coordinates). After that, the distribution information generating unit 403 summarizes the counted number to generate the distribution information. As a result, the distribution information shown in FIG. 13 is obtained. The generated distribution information is sent to the control apparatus 20. It should be noted that ID of the mobile station 60 is not included in the distribution information.

Figure 14:
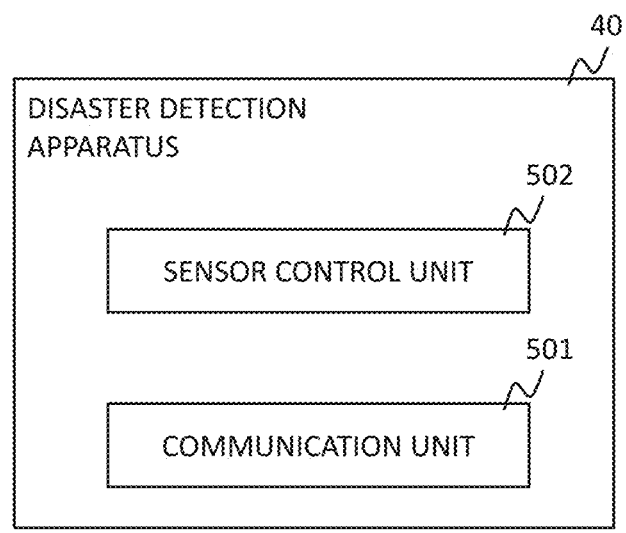
FIG. 14 is a block diagram showing processing modules of the disaster detection apparatus.

FIG. 14 is a block diagram showing processing modules of the disaster detection apparatus 40 according to the first example embodiment. As shown in FIG. 14, the disaster detection apparatus 40 comprises a communication unit 501 and a sensor control unit 502.

The communication unit 501 is means for controlling communication with other apparatus (for example, the control apparatus 20 or the like).

The sensor control unit 502 is means for controlling the sensor included in apparatus. More specifically, if the sensor 33 outputs signal which indicates that disaster happens, the sensor control unit 502 sends the disaster occurrence message to the control apparatus 20.

Figure 15:
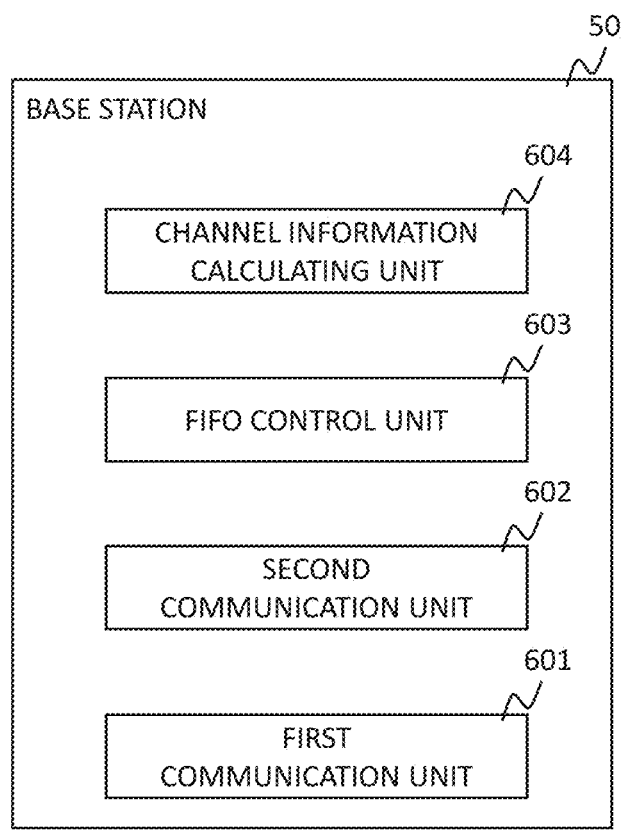
FIG. 15 is a block diagram showing processing modules of the base station.

FIG. 15 is a block diagram showing processing modules of the base station 50 according to the first example embodiment. As shown in FIG. 15, the base station 50 comprises a first communication unit 601, a second communication unit 602, a FIFO control unit 603 and a channel information calculating unit 604.

The first communication unit 601 is means for communicating with the mobile station 60.

The second communication unit 602 is means for communicating with other apparatus (for example, the control apparatus 10 or the like). The second communication unit 602 communicates with other apparatus by wired network or wireless network.

The FIFO control unit 603 is means for controlling a FIFO configured in the memory.

Figure 16:
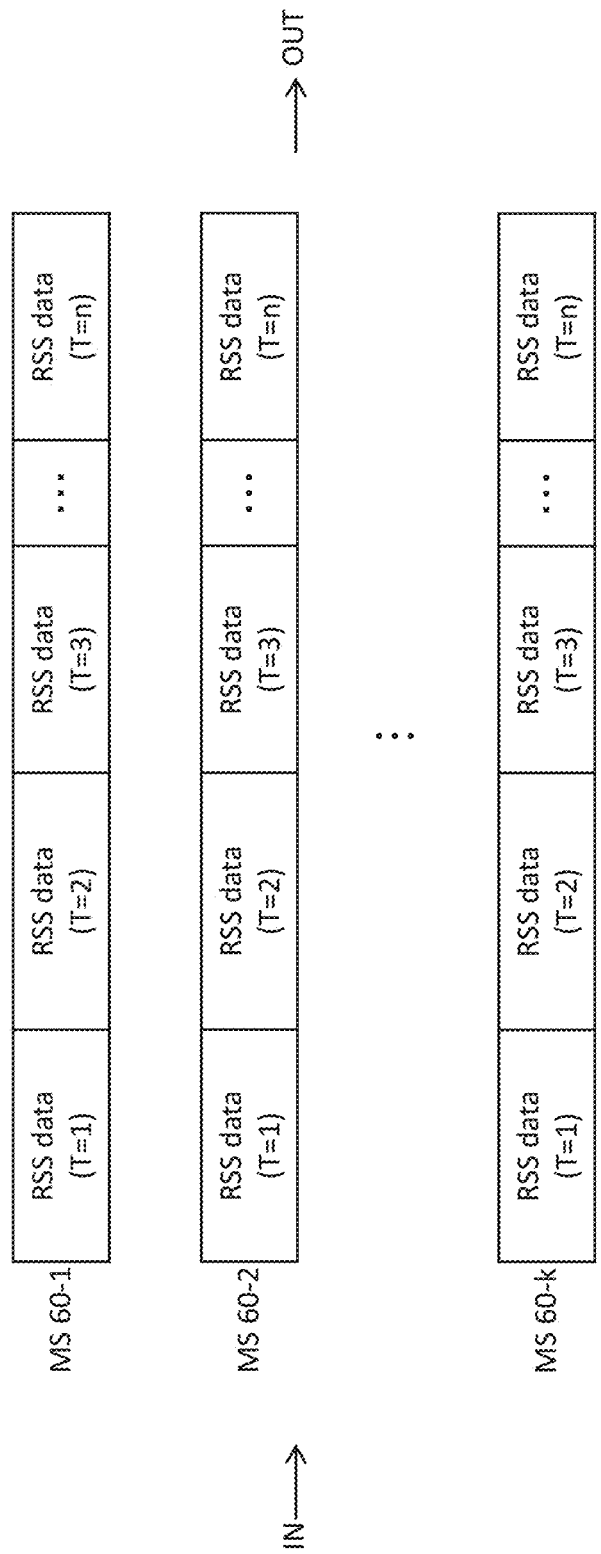
FIG. 16 is a diagram showing an example of FIFO.

FIG. 16 is a diagram showing an example of FIFO. As shown in FIG. 16, RSS data for each mobile station 60 are stored in FIFO. RSS data are stored in the calculated order. In FIG. 16, RSS data of the mobile station (MS) 60-1 to 60-$k$ ($k$ is positive integer) are shown. Further, in FIG. 16, the latest RSS data are indicated as T=1, and the oldest RSS data are indicated as T=n (n is positive integer).

When the base station 50 receives the stop FIFO message from the control apparatus 20, the FIFO control unit 603 stops updating the FIFO. After that, the FIFO control unit 603 sends contents of FIFO to the position processing apparatus 30. In the present example embodiment, the FIFO control unit 603 reads out the latest RSS data and sends those data to the position processing apparatus 30. For example, in FIG. 16, RSS data of the mobile station 60-1 to 60-$k$ at T=1 are read out and sent to the position processing apparatus 30.

The channel information calculating unit 604 is means for calculating the channel information (for example, RSS data). The channel information calculating unit 604 calculates the RSS data when the base station communicates with the mobile station 60. The calculated RSS data is stored in FIFO.

<Operation of System>

Figure 17:
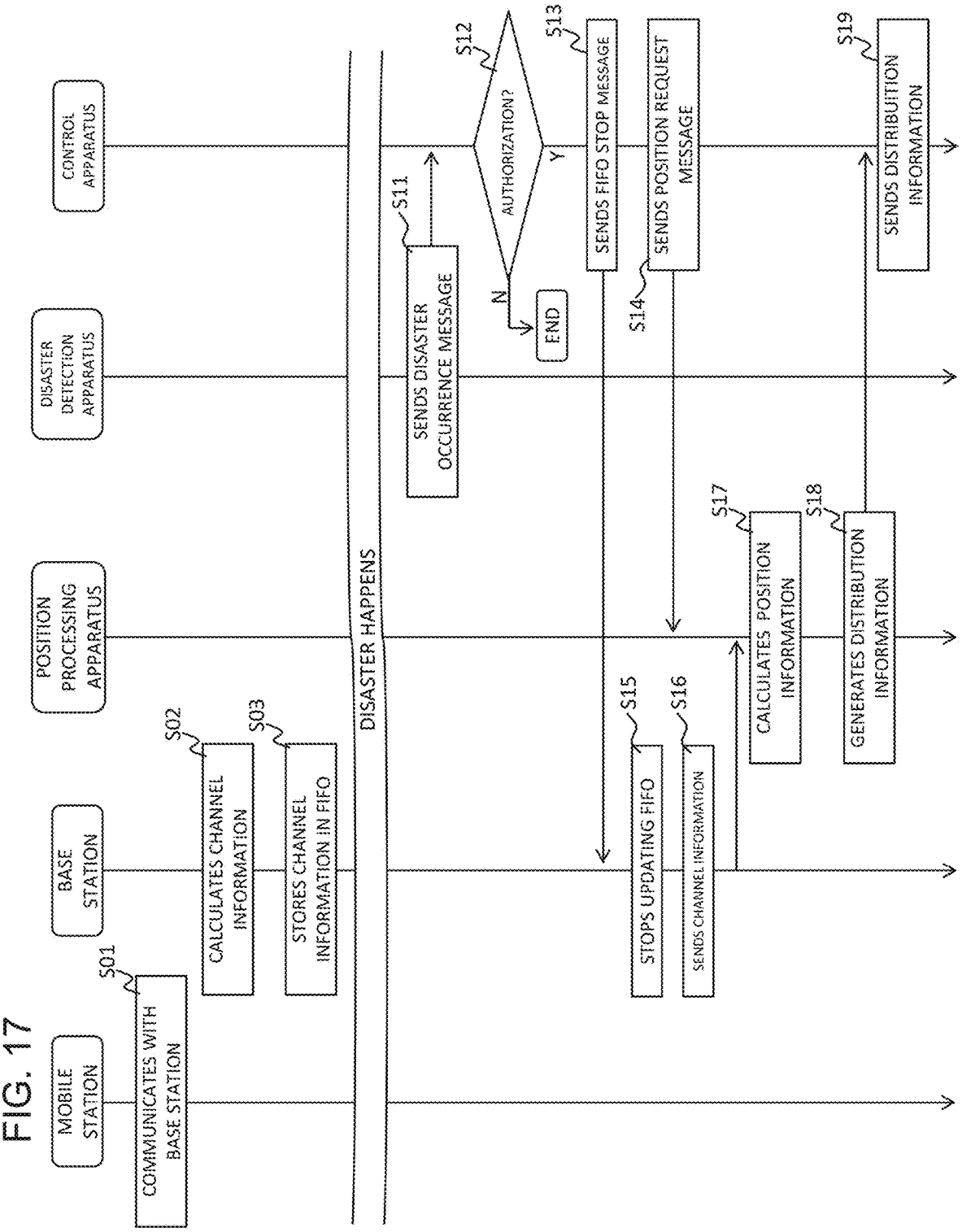
FIG. 17 is a sequence diagram showing the operation of the anti-disaster system according to the first example embodiment.

Next, an operation of the anti-disaster system according to the first example embodiment will be explained. FIG. 17 is a sequence diagram showing the operation of the anti-disaster system according to the first example embodiment. In FIG. 17, it is assumed that authorization is given to the control apparatus 20 in advance.

In step S01, the mobile station 60 communicates with the base station 50.

In step S02, the base station 50 calculates the channel information regarding the mobile station 60 with which the base station 50 communicates.

In step S03, the base station 50 stores the calculated channel information in FIFO.

At a normal situation (i.e., no disaster happens), processes of steps S01 to S03 are repeated.

When disaster happens, the disaster detection apparatus 40 sends the disaster occurrence message to the control apparatus 20 (step S11).

In step S12, the control apparatus 20 checks whether the control apparatus has the authorization from the authority server 10. If there is the authorization, the control apparatus 20 sends the stop FIFO message to the corresponding base station 50 (step S13). In addition, the control apparatus 20 sends the position request message to the corresponding position processing apparatus 30 (step S14). Thus, in a case where the control apparatus 20 has an authorization by the public institution (for example, fire department or the like), the control apparatus 20 instructs the position processing apparatus 30 to generate the distribution information.

When the base station 50 receives the stop FIFO message, the base station 50 stops updating the FIFO (step S15). After that, the base station sends the channel information to the processing apparatus 30 (step S16).

When the position processing apparatus 30 receives the position request message and the channel information, the position processing apparatus 30 starts to calculate the position information (step S17). After that, the position processing apparatus 30 generates the distribution information based on the calculated position information (step S18). The generated distribution information is sent to the control apparatus 20.

The control apparatus 20 sends the distribution information to the authority server 10 (step S19). That is, the control apparatus 20 provides the received distribution information to the public institution (i.e., the authority server 10).

In this way, in the anti-disaster system in the first example embodiment, the control apparatus 20 determines the disaster region concerned in accordance with the disaster occurrence message. As a result, because the control apparatus 20 can send the position request message and the stop FIFO message to necessary region, positioning information in the disaster region can be obtained with small computation. That is, positioning information regarding irrelevant region to the disaster is not necessary, and computation of position information is limited to the disaster region. In addition, because the distribution information sent to the authority server 10 does not include ID of the mobile station 60, the privacy is protected.

Second Example Embodiment

Next, a second example embodiment will be described more in detail. Since the second example embodiment is as same as the first example embodiment in the configuration of system and internal configuration of each apparatus, the following description will be made with a focus on the difference between the first and second example embodiments.

In the first example embodiment, it is not consider that there is a time difference between a time of the disaster occurrence and a time of making the distribution information. In the present embodiment, the distribution information is made, taking into account the time difference. As a result, more accurate distribution information is made.

Figure 18:
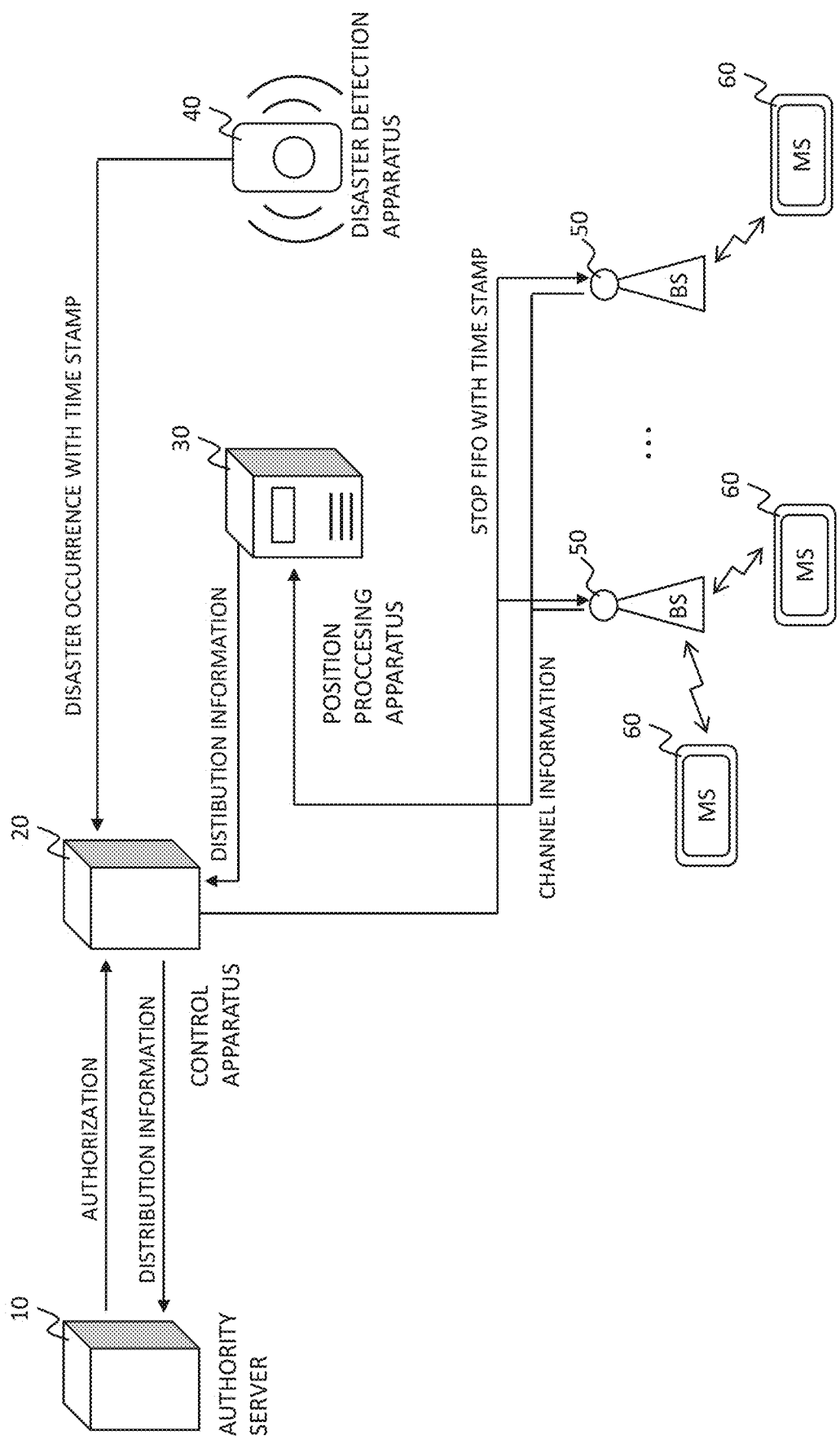
FIG. 18 is a diagram for explanation of a second example embodiment.

FIG. 18 is a diagram for explanation of the second example embodiment. Referring to FIG. 18, the disaster detection apparatus 40 sends the disaster occurrence message which includes time stamp. That is, the sensor control unit 502 stores the time when the disaster happened, and generates the disaster occurrence message with time stamp of the disaster occurrence. This message is sent control apparatus 20.

The control apparatus 20 sends the stop FIFO message which includes the time stamp. This time stamp indicates the time when the disaster happened.

The base station 50 sends the channel information which is taken into account the time stamp. More specifically, the FIFO control unit 603 selects the closest channel information (RSS data) to the time of the disaster occurrence based on the time stamp. In more detail, the FIFO control unit 603 subtracts time indicated by the time stamp from current time so as to obtain time difference. After that, the FIFO control unit 603 divides the time difference in a sampling period of the RSS data so as to obtain sample number from the latest RSS data to a target RSS data. The target RSS data corresponds to the data in the occurrence of the disaster. This target RSS data is read out and sent to the position processing apparatus 30. In this way, the base station 50 reads out the calculated channel information corresponding to the time of disaster occurrence.

The position processing apparatus 30 generates the distribution information using the above-mentioned RSS data. As a result, the distribution information close to the disaster occurrence is generated. It should be noted that in the second example embodiment, each apparatus (at least of the disaster detection apparatus 40 and the base station 50) is synchronized by a time server.

The above-mentioned matter can be realized by another method. For example, RSS data with generated time is stored in FIFO, and this time is used for selection of the target RSS data.

According to the second example embodiment, accurate distribution information is obtained.

Third Example Embodiment

Next, a third example embodiment will be described more in detail. Since the third example embodiment is as same as the first example embodiment in the configuration of system, the following description will be made with a focus on the difference between the first and third example embodiments.

In the first example embodiment, it is assumed that there is no mobile station whose status is idle. In the third example embodiment, the distribution information which includes an address of the mobile station 60 in idle state at the occurrence of the disaster is generated.

Figure 19:
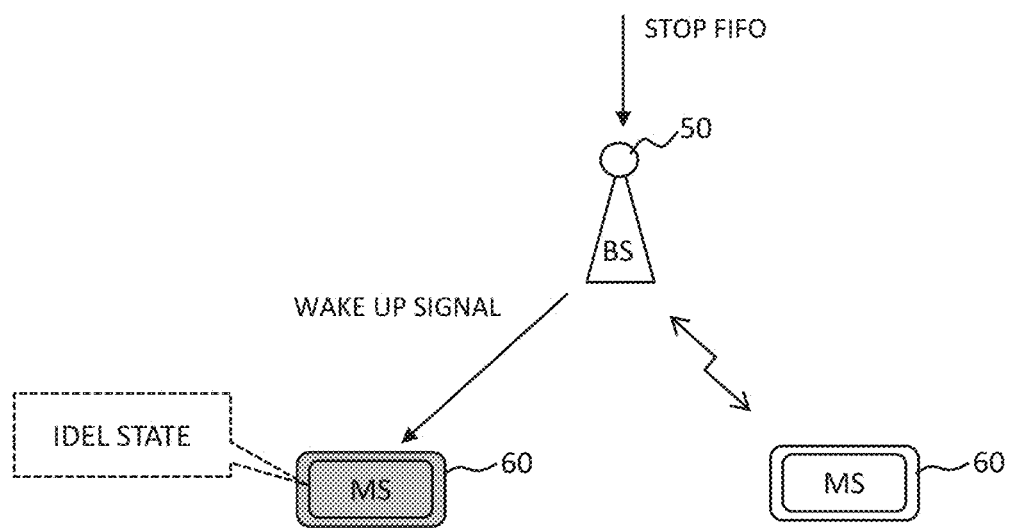
FIG. 19 is a diagram for explanation of a third example embodiment.

FIG. 19 is a diagram for explanation of the third example embodiment. Referring to FIG. 19, when the base station 50 receives the stop FIFO message, the base station 50 sends a wake up signal to the mobile station 60 in an idle state. By the wake up signal, the mobile station 60 in the idle state returns to a normal state. After the base station 50 acquires the channel information (the RSS data) regarding the retuned mobile station 60, the base station 50 sends the channel information of the retuned mobile station 60 to the position processing apparatus 30.

Figure 20:
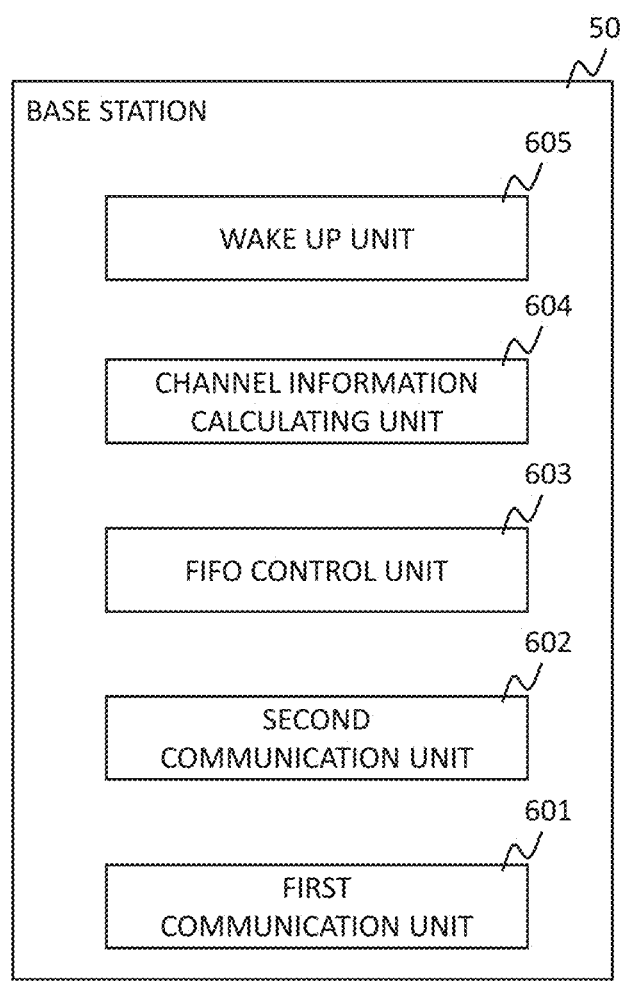
FIG. 20 is a block diagram showing processing modules of a base station according to the third example embodiment.

To realize the above-mentioned function, the base station 50 comprises a wake up unit 605 in addition to the element described in FIG. 15 (refer to FIG. 20).

According to the third example embodiment, because channel information of the mobile station in the idle state is obtained, the distribution information includes all the position of the mobile station in the disaster region.

Fourth Example Embodiment

Next, a fourth example embodiment will be described more in detail. In the fourth example embodiment, the function of the position processing apparatus 30 is realized in the control apparatus 20.

Figure 21:
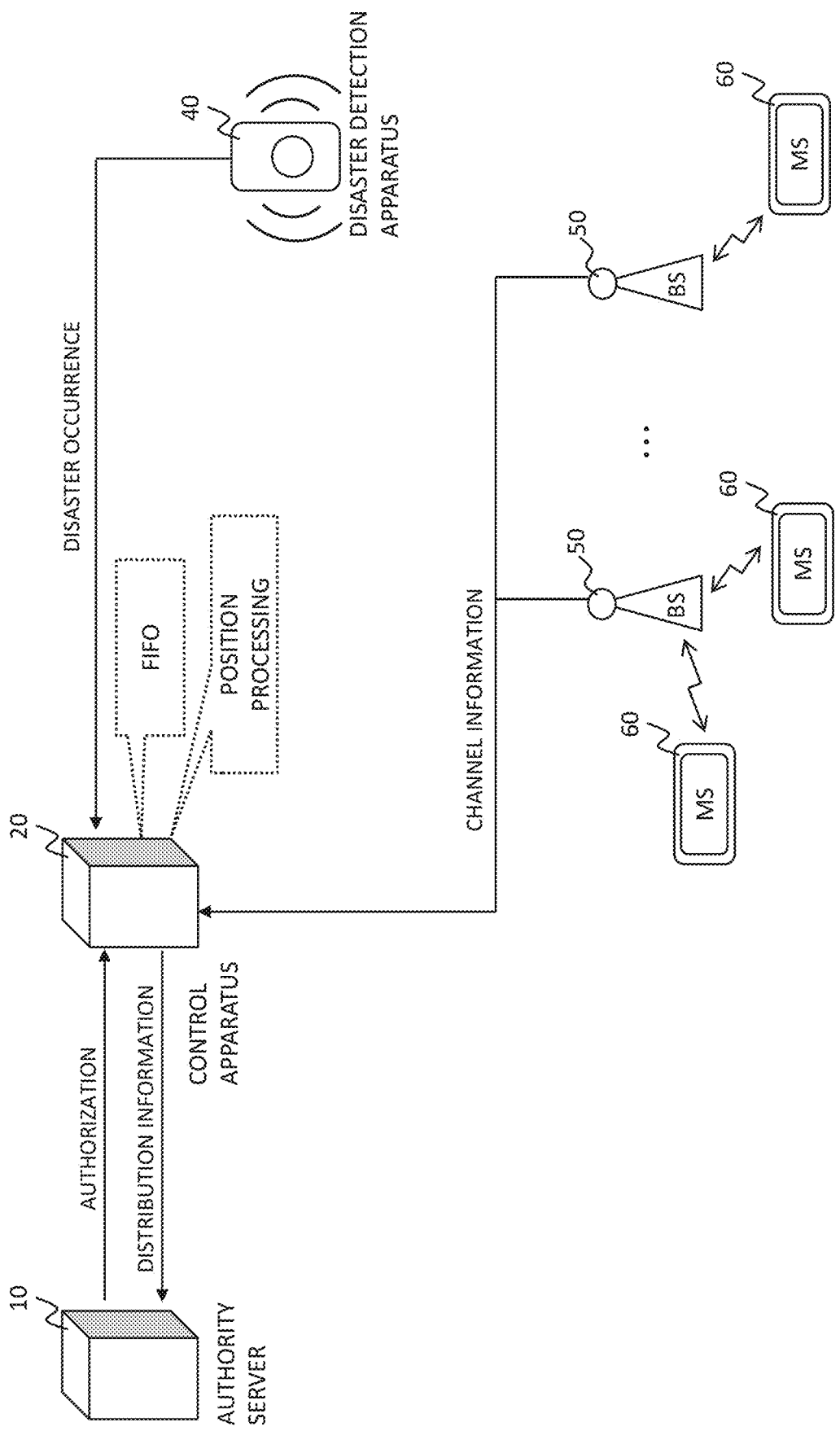
FIG. 21 is a conceptual view of an anti-disaster system according to a fourth example embodiment.
Figure 22:
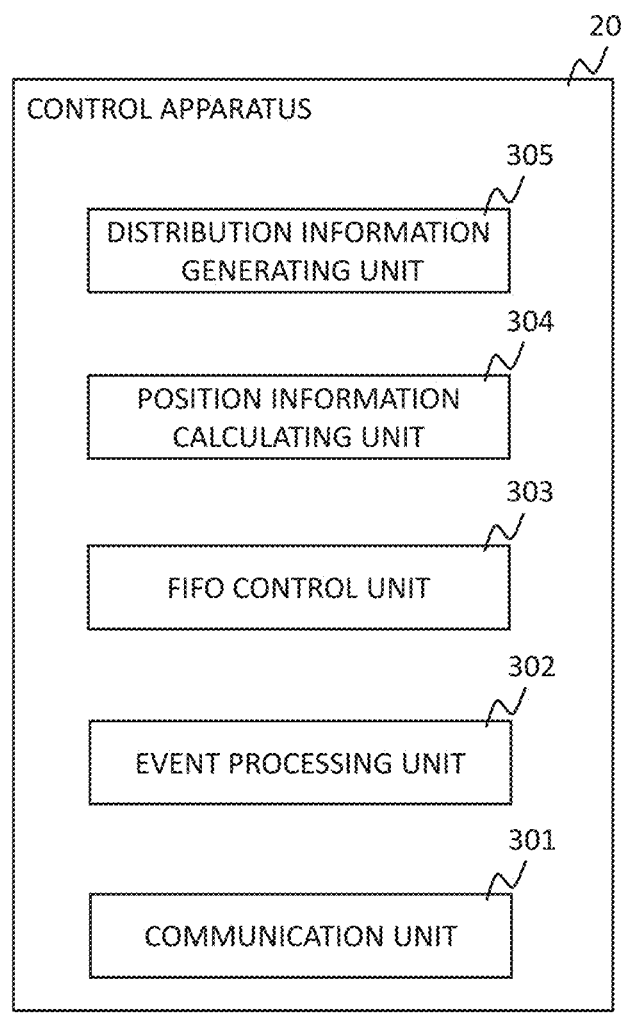
FIG. 22 is a block diagram showing processing modules of a control apparatus according to the fourth example embodiment.
Figure 23:
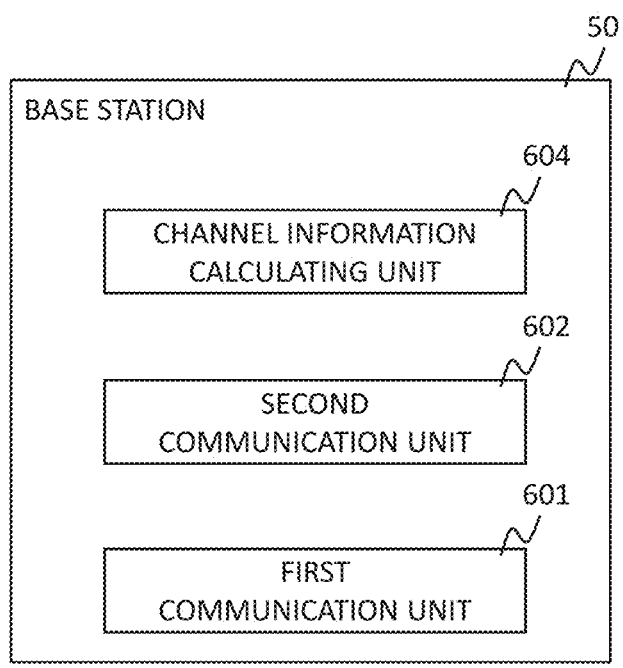
FIG. 23 is a block diagram showing processing modules of a base station according to the fourth example embodiment.

FIG. 21 is a conceptual view of an anti-disaster system according to the fourth example embodiment. As shown in FIG. 21, the control apparatus 20 comprise FIFO and the function of the position processing apparatus 30. In this case, the control apparatus 20 has processing modules described in FIG. 22. Referring to FIG. 22, a FIFO control unit 303, a position information calculating unit 304 and a distribution information generating unit 305 are added into the control apparatus 20 in FIG. 8. Because those elements can be similar to the above-mentioned elements in the first example embodiment, explanations thereof are omitted. In addition, as shown in FIG. 23, the FIFO control unit 603 is deleted from the base station 50 in the first example embodiment.

According to the fourth example embodiment, because it is possible to use an existing base station, the system can be built at a low cost. Particularly, because in C-RAN (Centralized Radio Access Network) architecture, computing ability of the base station is integrated into a single apparatus, it is preferred that the single apparatus (i.e., the control apparatus) performs position calculation, too.

Fifth Example Embodiment

Next, a fifth example embodiment will be described more in detail. In the fifth example embodiment, the function of the position processing apparatus 30 is realized in the base station 50.

Figure 24:
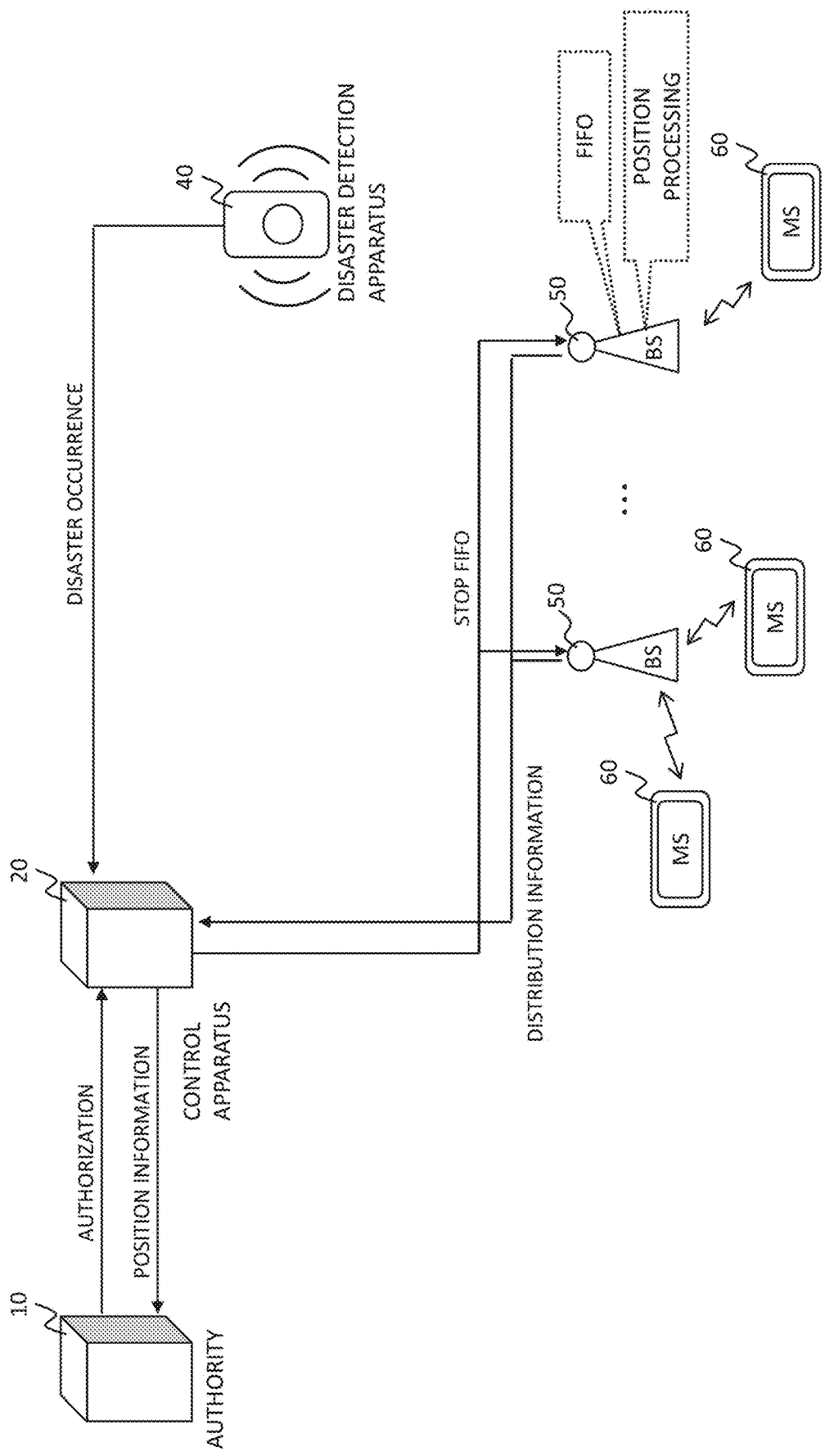
FIG. 24 is a conceptual view of an anti-disaster system according to a fifth example embodiment.
Figure 25:
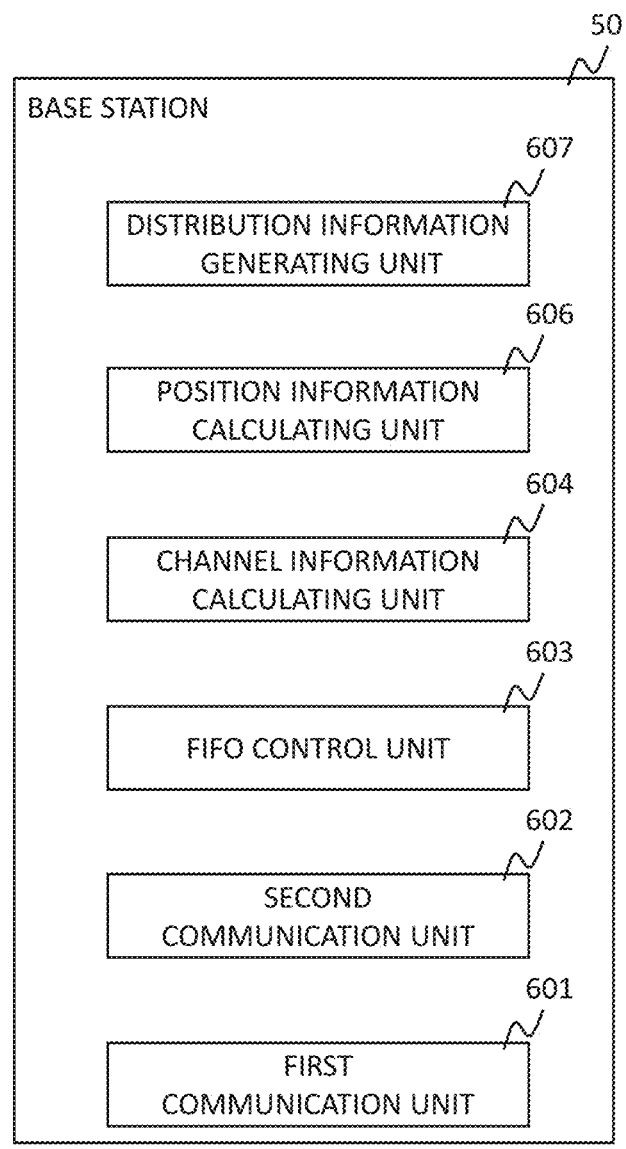
FIG. 25 is a block diagram showing processing modules of a base station according to the fifth example embodiment.

FIG. 24 is a conceptual view of an anti-disaster system according to the fifth example embodiment. As shown in FIG. 24, each base station 50 comprises the function of the position processing apparatus 30. In this case, the base station 50 has processing modules described in FIG. 25. Referring to FIG. 25, a position information calculating unit 606 and a distribution information generating unit 607 are added into the base station 50 in FIG. 15. Because those elements can be similar to the above-mentioned elements in the first example embodiment, explanations thereof are omitted.

It should be noted that the base station 60 needs information which other base station 50 has so as to calculate the position information regarding the mobile station 60. In this case, it is sufficient that the base stations 60 communicate with each other and exchange the necessary information. Alternatively, one of the base stations 60 may calculate the position information and generate the distribution information as a representative.

According to the fifth example embodiment, the distribution information can be obtained by simple system configuration.

Sixth Example Embodiment

Next, a sixth example embodiment will be described more in detail. In the sixth example embodiment, a concept of the above-mentioned embodiments is applied to a suspect investigation system.

Figure 26:
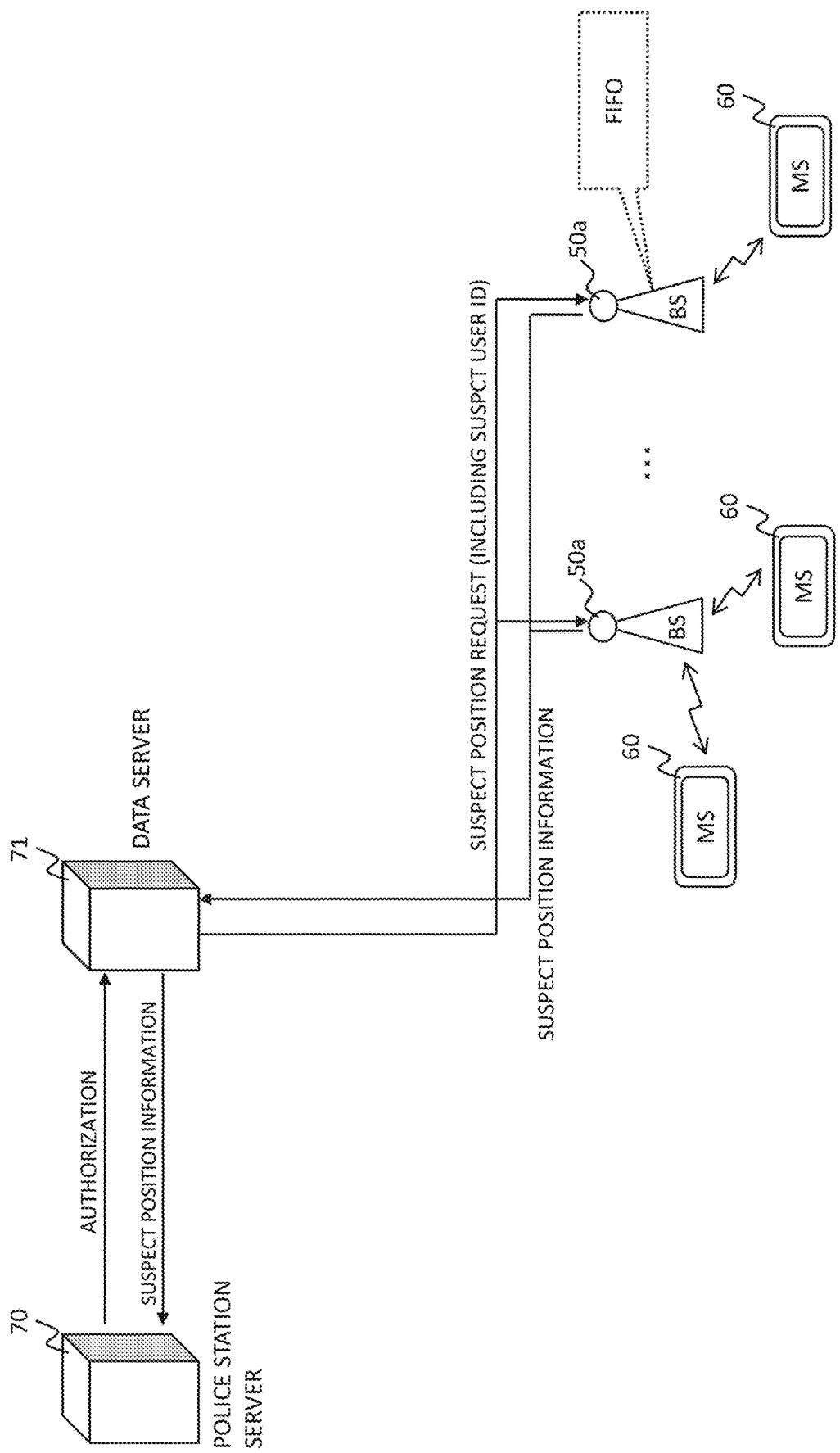
FIG. 26 is a conceptual view of a suspect investigation system according to the sixth example embodiment.

FIG. 26 is a conceptual view of the suspect investigation system according to the sixth example embodiment. In FIG. 26, the suspect investigation system comprises a police station server 70, a data server 71, base stations 50a and mobile stations 60.

The police station server 70 gives authorization to the data server 71. The police station server 70 notifies the data server 71 of a suspect user ID (ID of mobile station 60 which the suspect has). The data server deals with position information regarding the suspect. The data server 71 determines a region where the mobile station 60 of the suspect exists based on the suspect user ID. After that, the data server 71 sends a suspect position request message including the suspect user ID to the base station 50a in the determined region. After the base station 50a receives the suspect position request message, the base station 50a calculates the suspect position information (i.e., position or coordinates of the suspect). This information is sent to the police station server 70 via the data server 71.

Figure 27:
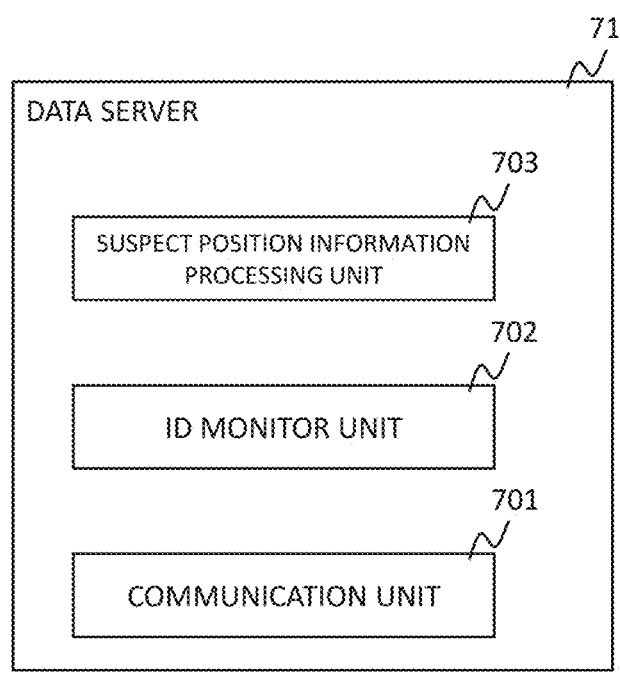
FIG. 27 is a block diagram showing processing modules of a data server according to the sixth example embodiment.
Figure 28:
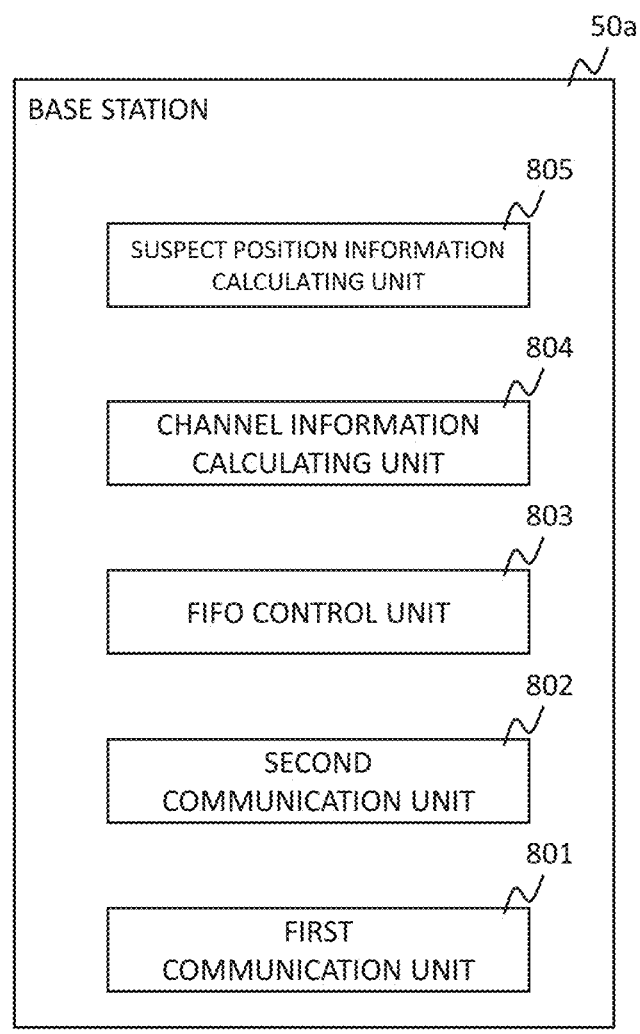
FIG. 28 is a block diagram showing processing modules of a base station according to the sixth example embodiment.

The data server 71 comprises a communication unit 701, an ID monitor unit 702 and a suspect position information processing unit 703 (refer to FIG. 27).

The communication unit 701 is means for controlling communication with other apparatus (for example, the police station server 70 or the like).

The ID monitor unit 702 manages a relationship between the suspect user ID and corresponding base station 50a based on information obtained from communication carriers. The ID monitor unit 702 determines the base station 50a where the suspect position request message are sent based on the notified suspect user ID from the police station server 70.

The suspect position information processing unit 703 sends the suspect position request message to the base station 50a determined by the ID monitor unit 702. When the base station 50a receives this message, the base station 50a sends suspect position information to the data server 71. The suspect position information processing unit 703 sends the suspect position information received from the base station 50a to the police station server 71.

The base station 50a comprises a first communication unit 801, a second communication unit 802, a FIFO control unit 803, a channel information calculating unit 804 and a suspect position information calculating unit 805.

Because the first communication unit 801, the second communication unit 802, the FIFO control unit 803 and the channel information calculating unit 804 can be similar to the elements explained in the first example embodiment, detailed explanations of those elements are omitted. That is, when the base station 50a communicates with the mobile station 60, the channel information (for example, RSS data) is calculated by the channel information calculating unit 804. The calculated channel information is stored in FIFO for each mobile station 60. In addition, when the base station 50a receives the suspect position request message, the FIFO control unit 803 stops updating FIFO.

The suspect position information calculating unit 803 is means for calculating position (coordinates) of the suspect based on the suspect user ID. More specifically, the suspect position information calculating unit 803 calculates the position of the mobile station having same ID as the suspect user ID notified from the data server 71 using the channel information store in FIFO. The suspect position information calculating unit 803 sends the suspect position information to the data server 71.

According to the sixth example embodiment, suspect is detected immediately.

While the preferred example embodiment of the present invention has been described, it is to be understood that the present invention is not limited to the example embodiment above and that further modifications, replacements, and adjustments may be added without departing from the basic technical concept of the present invention.

For example, in the above-mentioned embodiments, FIFO is used as a memory storing the channel information. However, a memory which can store the channel information for each mobile station may be used.

In the above-mentioned embodiments, updating the FIFO is stopped when the disaster occurs. However, if there is a sufficient capacity in the FIFO, it is not necessary to stop updating the FIFO.

In the above-mentioned embodiments, the control apparatus 20 sends the stop FIFO message to the base station 50. However, in place of the control apparatus 20, the position processing apparatus 30 can send the stop FIFO message to the base station 50. That is, in response to receiving the position request message, the position processing apparatus 30 may send the stop FIFO message.

In the above-mentioned embodiments, the disaster detection apparatus 40 sends the disaster occurrence message to only the control apparatus 20. However, the disaster detection apparatus 40 can also send the disaster occurrence message to apparatuses, which are included in disaster region, other than the control apparatus 20. In this case, when the disaster occurs, the position processing apparatus 30 and the base station 50 can perform the necessary processing, immediately.

In the above-mentioned embodiments, the authority server 10 and the control apparatus 20 are separate apparatuses. However, the authority server 10 may include the function of the control apparatus 20. Alternatively, another apparatus may be located between the authority server 10 and the control apparatus 20.

Preferred modes will now be recited.

(Mode 1)
The mode 1 is the same as the anti-disaster system according to the first aspect.

(Mode 2)
The anti-disaster system according to mode 1, wherein in a case where the control apparatus has an authorization by a public institution, the control apparatus instructs the position processing apparatus to generate the distribution information.

(Mode 3)
The anti-disaster system according to mode 2, wherein the position processing apparatus sends the generated distribution information to the control apparatus, and
the control apparatus provides the received distribution information to the public institution.

(Mode 4)
The anti-disaster system according to any one of modes 1 to 3, wherein when the disaster detection apparatus detects the occurrence of disaster, the disaster detection apparatus sends a disaster occurrence message to the control apparatus, and
the control apparatus determines the disaster region concerned based on a sender of the disaster occurrence message.

(Mode 5)
The anti-disaster system according to any one of modes 1 to 4, wherein the control apparatus sends a position request message to the position processing apparatus located in the disaster region concerned, and
when the position processing apparatus receives the position request message, the position processing apparatus generates the distribution information.

(Mode 6)
The anti-disaster system according to any one of modes 1 to 5, wherein the control apparatus instructs the base station located in the disaster region concerned to send channel information, which is calculated by a communication with the mobile station, to the position processing apparatus located in the disaster region concerned.

(Mode 7)
The anti-disaster system according to mode 6, wherein the position processing apparatus calculates position information, which indicates a position of the mobile station located in the disaster region concerned, based on the channel information received from the base station located in the disaster region concerned.

(Mode 8)
The anti-disaster system according to mode 7, wherein the position processing apparatus generates the distribution information based on the calculated position information.

(Mode 9)
The anti-disaster system according to any one of modes 6 to 8, wherein the base station comprises FIFO (First-In First-Out) memory which stores the calculated channel information.

(Mode 10)
The anti-disaster system according to mode 9, wherein the control apparatus sends a stop FIFO message to the base station located in the disaster region concerned as the instruction, and
when the base station receives the stop FIFO message, the base station stops updating the FIFO memory and reads out the calculated channel information, which is sent to the position processing apparatus, from the FIFO memory.

(Mode 11)
The anti-disaster system according to mode 10, wherein the base station reads out the calculated channel information corresponding to a time of disaster occurrence.

(Mode 12)
The anti-disaster system according to any one of modes 1 to 11, wherein the position processing apparatus generates the distribution information not including identifier of the mobile station.

(Mode 13)
The anti-disaster system according to any one of modes 1 to 12, wherein the base station sends a wake up signal to wake up the mobile station in idle state.

(Mode 14)
The anti-disaster system according to mode 1, wherein the control apparatus generates the distribution information instead of the position processing apparatus.

(Mode 15)
The anti-disaster system according to mode 1, wherein the control apparatus instructs the base station located in the disaster region concerned, in place of the position processing apparatus, to generate the distribution information.

(Mode 16)
The mode 16 is the same as the information generating method according to the second aspect.

(Mode 17)
The mode 17 is the same as the storage medium according to the third aspect.

(Mode 18)
A control apparatus included in an anti-disaster system, the anti-disaster system further including:
a plurality of disaster detection apparatuses each of which detects an occurrence of disaster;

a plurality of position processing apparatuses each of which generates distribution information which indicates a number of mobile stations in each position; and a plurality of base stations each of which communicates with the mobile station; wherein one disaster detection apparatus, one position processing apparatus and at least one base station are located in a same region, and wherein the control apparatus communicates with the plurality of disaster detection apparatuses, the plurality of base stations and the plurality of position processing apparatuses, and the control apparatus determines a disaster region concerned among a plurality of regions, based on a message from the disaster detection apparatus located in the disaster region concerned, and the control apparatus instructs the position processing apparatus located in the disaster region concerned to generate the distribution information based on information from the base station located in the disaster region concerned.

(Mode 19)

A suspect investigation system, comprising:

a plurality of base stations each of which communicates with the mobile station; and a data server that communicates with the plurality of base stations, wherein the data server determines the base station that is a destination of a suspect position request including a suspect user ID, based on information provided from a police station, and the base station received the suspect position request calculates a suspect position information which indicates a position of the suspect based on information which is obtained from a communication with the mobile station.

The disclosure of Patent Literature given above is hereby incorporated by reference into this specification. The example embodiments may be changed and adjusted within the aspect of the entire disclosure (including claims) of the present invention and based on the basic technological concept. Within the scope of the claims of the present invention, various disclosed elements may be combined and selected in a variety of ways. That is, it is to be understood that modifications, changes as well as selections and combinations of elements that may be made by those skilled in the art within the entire disclosure of the present invention are requested to be included.

REFERENCE SIGNS LIST 10 authority server
20, 104 control apparatus
21, 31, 41 CPU (Central Processing Unit)
22, 32, 42 memory
23 input/output interface
24, 34, 44 NIC (Network Interface Card)
30, 102 position processing apparatus
33 sensor
40, 101 disaster detection apparatus
43 transmitter/receiver
45 antenna
50, 50a, 103 base station (BS)
60 mobile station (MS)
70 police station server
71 data server
201, 301, 401, 501, 701 communication unit
202 authorization unit
203 distribution information processing unit
302 event processing unit
303, 603, 803 FIFO control unit
304, 402, 606 position information calculating unit
305, 403, 607 distribution information generating unit
502 sensor control unit
601, 801 first communication unit
602, 802 second communication unit
604, 803 channel information calculating unit
605 wake up unit
702 id monitor unit
703 suspect position information processing unit
805 suspect position information calculating unit

What is claimed is:

1. An anti-disaster system, comprising:
a plurality of disaster detection apparatuses each of which detects an occurrence of disaster;
a plurality of position processing apparatuses each of which generates distribution information which indicates a number of mobile stations in each position;
a plurality of base stations each of which communicates with a mobile station; and
a control apparatus that communicates with the plurality of disaster detection apparatuses, the plurality of base stations and the plurality of position processing apparatuses, wherein
one disaster detection apparatus, one position processing apparatus and at least one base station are located in a same region, and
the control apparatus determines a disaster region concerned among a plurality of regions, based on a message from the disaster detection apparatus located in the disaster region concerned,
the control apparatus instructs the base station located in the disaster region concerned to send channel information, which is calculated by a communication with the mobile station, to the position processing apparatus located in the disaster region concerned, and
the control apparatus instructs the position processing apparatus located in the disaster region concerned to generate the distribution information based on information from the base station located in the disaster region concerned.

2. The anti-disaster system according to claim 1, wherein in a case where the control apparatus has an authorization by a public institution, the control apparatus instructs the position processing apparatus to generate the distribution information.

3. The anti-disaster system according to claim 2, wherein the position processing apparatus sends the generated distribution information to the control apparatus, and
the control apparatus provides the received distribution information to the public institution.

4. The anti-disaster system according to claim 1, wherein when the disaster detection apparatus detects the occurrence of disaster, the disaster detection apparatus sends a disaster occurrence message to the control apparatus, and
the control apparatus determines the disaster region concerned based on a sender of the disaster occurrence message.

5. The anti-disaster system according to claim 1, wherein the control apparatus sends a position request message to the position processing apparatus located in the disaster region concerned, and
when the position processing apparatus receives the position request message, the position processing apparatus generates the distribution information.

6. The anti-disaster system according to claim 1, wherein the position processing apparatus calculates position information, which indicates a position of the mobile station located in the disaster region concerned, based on the channel information received from the base station in the disaster region.

7. The anti-disaster system according to claim 6, wherein the position processing apparatus generates the distribution information based on the calculated position information.

8. The anti-disaster system according to claim 1, wherein the base station comprises FIFO (First-In First-Out) memory which stores the calculated channel information.

9. The anti-disaster system according to claim 8, wherein the control apparatus sends a stop FIFO message to the base station located in the disaster region concerned as the instruction, and
when the base station receives the stop FIFO message, the base station stops updating the FIFO memory and reads out the calculated channel information, which is sent to the position processing apparatus, from the FIFO memory.

10. The anti-disaster system according to claim 9, wherein the base station reads out the calculated channel information corresponding to a time of disaster occurrence.

11. The anti-disaster system according to claim 1, wherein the position processing apparatus generates the distribution information not including identifier of the mobile station.

12. The anti-disaster system according to claim 1, wherein the base station sends a wake up signal to wake up the mobile station in idle state.

13. The anti-disaster system according to claim 1, wherein the control apparatus generates the distribution information instead of the position processing apparatus.

14. The anti-disaster system according to claim 1, wherein the control apparatus instructs the base station located in the disaster region concerned, in place of the position processing apparatus, to generate the distribution information.

15. An information generating method in an anti-disaster system comprising:
a plurality of disaster detection apparatuses each of which detects an occurrence of disaster;
a plurality of position processing apparatuses each of which generates distribution information which indicates a number of mobile stations in each position;
a plurality of base stations each of which communicates with a mobile station; and
a control apparatus that communicates with the plurality of disaster detection apparatuses, the plurality of base stations and the plurality of position processing apparatuses, wherein
one disaster detection apparatus, one position processing apparatus and at least one base station are located in a same region, and
the information generating method, comprising:
the control apparatus determining a disaster region concerned among a plurality of regions, based on a message from the disaster detection apparatus located in the disaster region concerned,
the control apparatus instructing the base station located in the disaster region concerned to send channel information, which is calculated by a communication with the mobile station, to the position processing apparatus located in the disaster region concerned, and
the control apparatus instructing the position processing apparatus located in the disaster region concerned to generate the distribution information based on information from the base station located in the disaster region concerned.

16. A non-transitory computer-readable recording medium storing an anti-disaster program executed by a computer embedded on a control apparatus included in an anti-disaster system, the anti-disaster system further including:
a plurality of disaster detection apparatuses each of which detects an occurrence of disaster;
a plurality of position processing apparatuses each of which generates distribution information which indicates a number of mobile stations in each position; and
a plurality of base stations each of which communicates with a mobile station; wherein
one disaster detection apparatus, one position processing apparatus and at least one base station are located in a same region, and wherein
the program causes the computer to execute:
communicating with the plurality of disaster detection apparatuses, the plurality of base stations and the plurality of position processing apparatuses;
determining a disaster region concerned among a plurality of regions, based on a message from the disaster detection apparatus located in the disaster region concerned,
instructing the base station located in the disaster region concerned to send channel information, which is calculated by a communication with the mobile station, to the position processing apparatus located in the disaster region concerned, and
instructing the position processing apparatus located in the disaster region concerned to generate the distribution information based on information from the base station located in the disaster region concerned.

* * * * *